[19] United States Patent
Cheng et al.

(10) Patent No.: US 11,960,140 B2
(45) Date of Patent: Apr. 16, 2024

(54) IMAGING LENS ASSEMBLY MODULE, CAMERA MODULE AND ELECTRONIC DEVICE

(71) Applicant: LARGAN PRECISION CO., LTD., Taichung (TW)

(72) Inventors: Jyun-Jia Cheng, Taichung (TW); Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/172,384

(22) Filed: Feb. 22, 2023

(65) Prior Publication Data

US 2023/0194825 A1 Jun. 22, 2023

Related U.S. Application Data

(63) Continuation of application No. 16/892,395, filed on Jun. 4, 2020, now Pat. No. 11,614,595.

(30) Foreign Application Priority Data

Sep. 11, 2019 (TW) ................................. 108132854

(51) Int. Cl.
*G02B 7/02* (2021.01)
*G02B 13/00* (2006.01)

(52) U.S. Cl.
CPC ......... G02B 7/021 (2013.01); G02B 13/0045 (2013.01)

(58) Field of Classification Search
CPC ........ G02B 7/021; G02B 7/022; G02B 7/023; G02B 7/025; G02B 7/26; G02B 5/003; G02B 13/0015; G02B 27/0018
See application file for complete search history.

(56) References Cited

U.S. PATENT DOCUMENTS

| 7,391,457 B2 | 6/2008 | Fujimoto et al. |
| 7,417,810 B2 | 8/2008 | Feng et al. |
| 7,944,633 B2 | 5/2011 | Shyu et al. |
| 8,363,341 B2 | 1/2013 | Chang et al. |

(Continued)

FOREIGN PATENT DOCUMENTS

| TW | 201932908 A | 8/2019 |
| WO | 2014162846 A1 | 10/2014 |

*Primary Examiner* — Ephrem Z Mebrahtu
(74) *Attorney, Agent, or Firm* — McClure, Qualey & Rodack, LLP

(57) ABSTRACT

An imaging lens assembly module has an optical axis, and includes an optical element set, a light blocking element assembling surface, and a light absorbing layer. The optical element set includes an optical lens element and a light blocking sheet. The optical lens element is a plastic lens element, and includes an optical effective portion and an outer peripheral portion. The light blocking sheet is disposed on the outer peripheral portion, and spaced apart from the outer peripheral portion. The light blocking sheet includes an object-side surface, an image-side surface and an inner opening surface. The inner opening surface surrounds a through hole of the light blocking sheet. The light blocking sheet is disposed on the light blocking element assembling surface. The light absorbing layer is disposed on the image-side surface and for fixing the light blocking sheet on the light blocking element assembling surface.

11 Claims, 24 Drawing Sheets

(56) References Cited

U.S. PATENT DOCUMENTS

| | | |
|---|---|---|
| 8,526,129 B2 | 9/2013 | Hirata et al. |
| 9,069,119 B2 | 6/2015 | Takase et al. |
| 9,621,772 B2 | 4/2017 | Schmieder et al. |
| 10,928,560 B2 | 2/2021 | Chou |
| 2015/0226931 A1 | 8/2015 | Huang |
| 2016/0349504 A1 | 12/2016 | Kim et al. |
| 2016/0370579 A1 | 12/2016 | Cho et al. |
| 2017/0139176 A1 | 5/2017 | Wei et al. |
| 2017/0176649 A1* | 6/2017 | Chang ................ G02B 5/003 |
| 2018/0095296 A1 | 4/2018 | Lin et al. |
| 2018/0246258 A1* | 8/2018 | Shiraiwa ............ G02B 13/0085 |
| 2018/0335607 A1* | 11/2018 | Lin .................... G02B 7/021 |

* cited by examiner

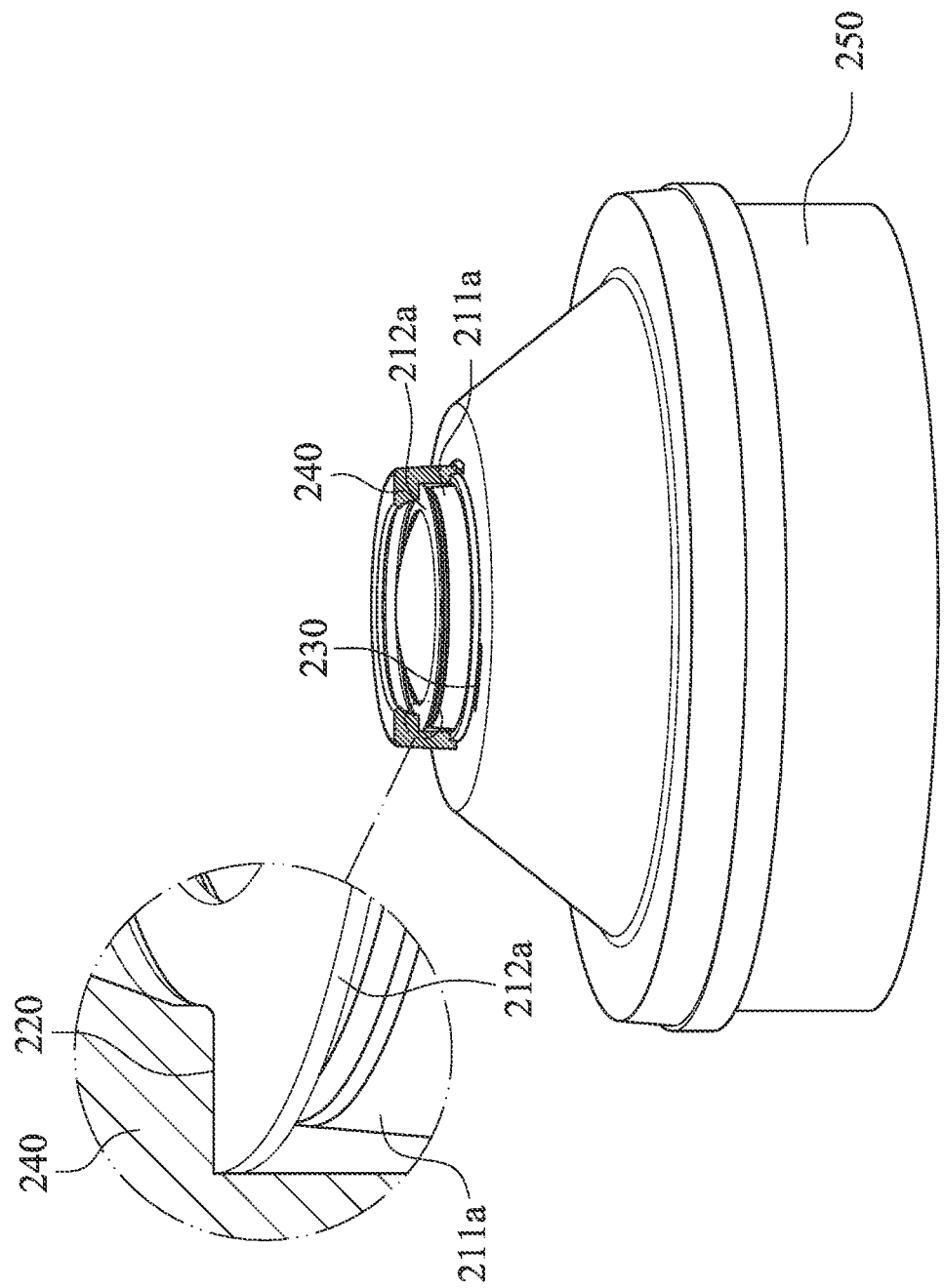

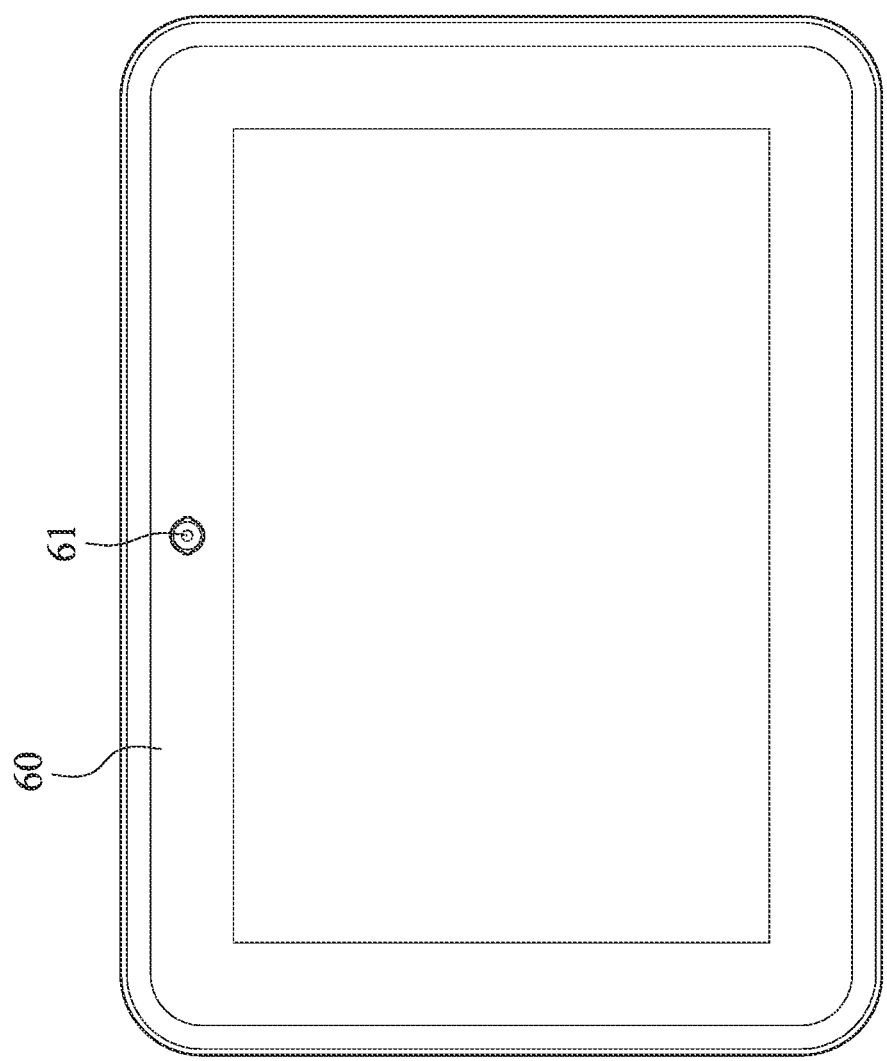

IMAGING LENS ASSEMBLY MODULE, CAMERA MODULE AND ELECTRONIC DEVICE

RELATED APPLICATIONS

The present application is a continuation of the application Ser. No. 16/892,395, filed Jun. 4, 2020, which claims priority to Taiwan Application Serial Number 108132854, filed Sep. 11, 2019, which is herein incorporated by reference.

BACKGROUND

Technical Field

The present disclosure relates to an imaging lens assembly module and a camera module. More particularly, the present disclosure relates to an imaging lens assembly module and a camera module applicable to a portable electronic device.

Description of Related Art

In recent years, portable electronic devices have developed rapidly. For example, intelligent electronic devices and tablets have been filled in the lives of modern people, and camera modules and imaging lens assembly modules thereof mounted on portable electronic devices have also prospered. However, as technology advances, the quality requirements of imaging lens assembly modules are becoming higher and higher. Therefore, an imaging lens assembly module with an ability of reducing a reflection of a stray light and promoting a mechanical strength needs to be developed.

SUMMARY

According to one aspect of the present disclosure, an imaging lens assembly module has an optical axis, and includes an optical element set, a light blocking element assembling surface, and a light absorbing layer. The optical element set includes at least one optical lens element and at least one light blocking sheet. The optical lens element is a plastic lens element, an object side of the optical lens element is without additional one or more optical lens elements disposed thereon, and the optical lens element, in order from the optical axis to a peripheral region thereof, includes an optical effective portion and an outer peripheral portion. The outer peripheral portion surrounds the optical effective portion. The light blocking sheet is disposed on an object side of the outer peripheral portion of the optical lens element, and spaced apart from the outer peripheral portion of the optical lens element. The light blocking sheet includes an object-side surface, an image-side surface and an inner opening surface. The inner opening surface surrounds a through hole of the light blocking sheet, and the inner opening surface is connected to the object-side surface and the image-side surface. The light blocking element assembling surface is disposed on an object side of the light blocking sheet, and the light blocking element assembling surface faces toward an image side of the imaging lens assembly module and is circular annular and for the light blocking sheet mounted thereon. The light absorbing layer is disposed on the image-side surface of the light blocking sheet and for fixing the light blocking sheet on the light blocking element assembling surface. A void is maintained between the light blocking sheet and the outer peripheral portion of the optical lens element.

According to one aspect of the present disclosure, a camera module includes the imaging lens assembly module of the aforementioned aspect and an image sensor module. The imaging lens assembly module is disposed on the image sensor module, and the image sensor module includes an image sensor.

According to one aspect of the present disclosure, an electronic device includes the camera module of the aforementioned aspect.

According to another aspect of the present disclosure, an imaging lens assembly module has an optical axis, and includes an optical element set, a light blocking element assembling surface, and a light absorbing layer. The optical element set includes at least one optical lens element and at least one light blocking sheet. The optical lens element is a plastic lens element, an object side of the optical lens element is without additional one or more optical lens elements disposed thereon, and the optical lens element, in order from the optical axis to a peripheral region thereof, includes an optical effective portion and an outer peripheral portion. The outer peripheral portion surrounds the optical effective portion. The light blocking sheet is disposed on an object side of the outer peripheral portion of the optical lens element, and spaced apart from the outer peripheral portion of the optical lens element. The light blocking sheet includes an object-side surface, an image-side surface and an inner opening surface. The inner opening surface surrounds a through hole of the light blocking sheet, and the inner opening surface is connected to the object-side surface and the image-side surface. The light blocking element assembling surface is disposed on an object side of the light blocking sheet, and the light blocking element assembling surface faces toward an image side of the imaging lens assembly module and is circular annular and for the light blocking sheet mounted thereon. The light absorbing layer is disposed on the image-side surface of the light blocking sheet and for fixing the light blocking sheet on the light blocking element assembling surface. The light absorbing layer surrounds the through hole of the light blocking sheet to form a concave-curved ring.

According to another aspect of the present disclosure, an imaging lens assembly module has an optical axis, and includes an optical element set, a light blocking element assembling surface, and a light absorbing layer. The optical element set includes at least one optical lens element and at least one light blocking sheet. The optical lens element is a plastic lens element. One side of an object side and an image side of the optical lens element is without additional one or more optical lens elements disposed thereon, and the optical lens element, in order from the optical axis to a peripheral region thereof, includes an optical effective portion and an outer peripheral portion. The outer peripheral portion surrounds the optical effective portion. The light blocking sheet is disposed on one side of an object side and an image side of the outer peripheral portion of the optical lens element which is without additional one or more optical lens elements disposed thereon, and spaced apart from the outer peripheral portion of the optical lens element. The light blocking sheet includes an object-side surface, an image-side surface and an inner opening surface. The inner opening surface surrounds a through hole of the light blocking sheet, and the inner opening surface is connected to the object-side surface and the image-side surface. The light blocking element assembling surface is disposed on one side of an object side and an image side of the light blocking sheet which is without additional one or more optical lens elements disposed thereon, and the light blocking element assembling surface faces toward the optical lens element and is circular annular and for the light blocking sheet mounted thereon. The light absorbing layer is disposed on one side of the object side and the image side of the light blocking sheet which has the optical lens element and for fixing the light blocking sheet on the light blocking element assembling surface. The light absorbing layer surrounds the through hole of the light blocking sheet to form a concave-curved ring. When a diameter of the through hole of the light blocking sheet is $\psi$sa, and an outer diameter of the light blocking sheet is $\psi$sd, the following condition is satisfied: 0.08 mm<($\psi$sd−$\psi$sa)/2<0.5 mm.

BRIEF DESCRIPTION OF THE DRAWINGS

The present disclosure can be more fully understood by reading the following detailed description of the embodiment, with reference made to the accompanying drawings as follows:

FIG. 2E is a cross-sectional view of the tip-end minimal opening structure of the imaging lens assembly module according to the 2nd embodiment in FIG. 2A.

FIG. 6 is a schematic view of an electronic device according to the 6th embodiment of the present disclosure.

DETAILED DESCRIPTION

Figure 1A:
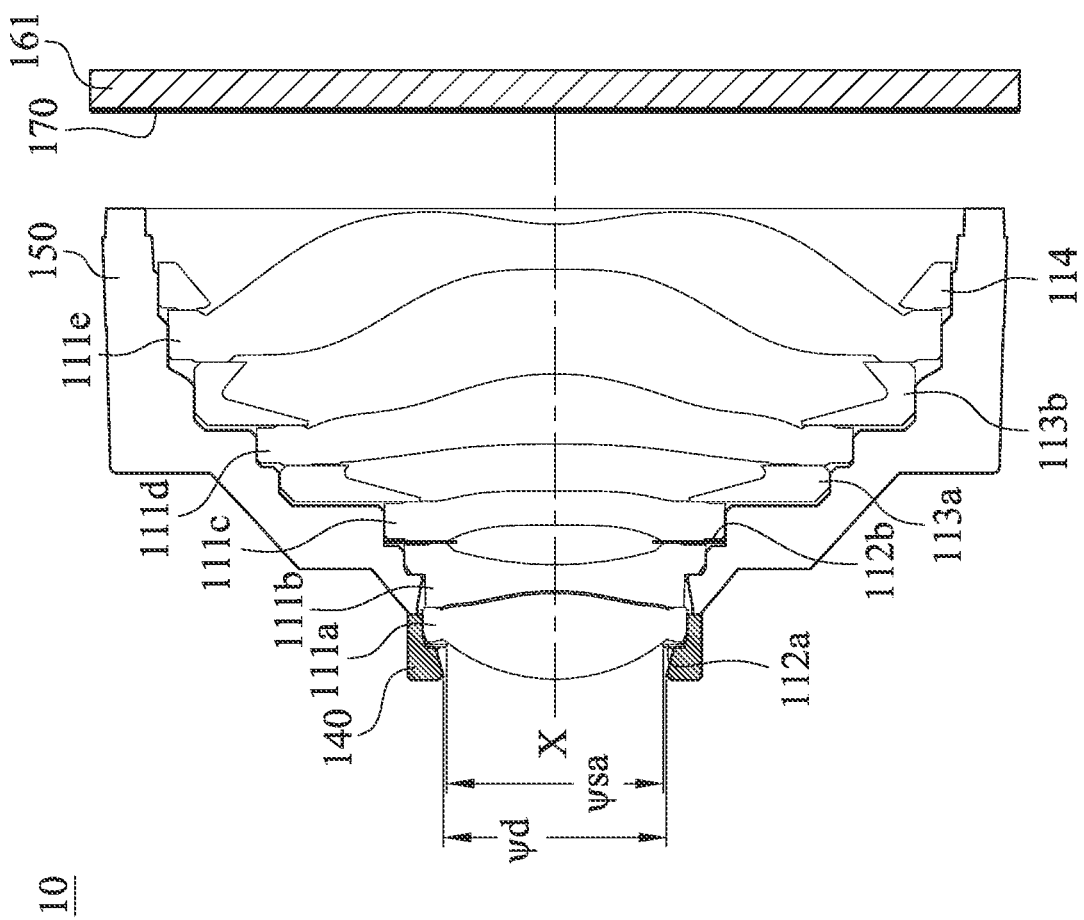
FIG. 1A is a schematic view of a camera module according to the 1st embodiment of the present disclosure.

The present disclosure provides an imaging lens assembly module. The imaging lens assembly module has an optical axis, and includes an optical element set, a light blocking element assembling surface and a light absorbing layer. The optical element set includes at least one optical lens element and at least one light blocking sheet. The optical lens element is a plastic lens element, and an object side of the optical lens element is without additional one or more optical lens element disposed thereon. The optical lens element, in order from the optical axis to a peripheral region of the optical lens element, includes an optical effective portion and an outer peripheral portion, wherein the outer peripheral portion surrounds the optical effective portion. The light blocking sheet is disposed on an object side of the outer peripheral portion of the optical lens element, or disposed on one side of the object side and an image side of the outer peripheral portion of the optical lens element which is without additional one or more optical lens element disposed thereon. The light blocking sheet is spaced apart from the outer peripheral portion of the optical lens element, and includes an object-side surface, an image-side surface and an inner opening surface, wherein the inner opening surface surrounds a through hole of the light blocking sheet, and the inner opening surface is connected to the object-side surface and the image-side surface. The light blocking element assembling surface is disposed on an object side of the light blocking sheet, and faces toward an image side of the imaging lens assembly module. Or, the light blocking element assembling surface is disposed on one side of an object side and an image side of the light blocking sheet which is without additional one or more optical lens elements disposed thereon, and the light blocking element assembling surface faces toward the optical lens element. The light blocking element assembling surface is circular annular for the light blocking sheet mounted thereon. The light absorbing layer is disposed on the image-side surface of the light blocking sheet, or disposed on one side of the object side and the image side of the light blocking sheet which has the optical lens element. The light absorbing layer is for fixing the light blocking sheet on the light blocking element assembling surface. Therefore, the light absorbing layer can be for fixing the light blocking sheet on the light blocking element assembling surface, and a stray light in the imaging lens assembly module can be absorbed via the light absorbing layer to ensure the better light blocking performance.

A void is maintained between the light blocking sheet and the outer peripheral portion of the optical lens element. Therefore, the precisely manufactured light blocking sheet does not be compressed via the optical lens element. Furthermore, the misgiving which the light blocking sheet is destroyed during the assembling process can be reduced to ensure the better light blocking performance. Moreover, the light blocking sheet can further be an aperture stop of the imaging lens assembly module to promote the optical quality of the aperture stop.

The light absorbing layer surrounds the through hole of the light blocking sheet to form a concave-curved ring. Furthermore, an initial condition of the light absorbing layer is a liquid, the light absorbing layer is visible absorption, and the light absorbing layer can be made of a quick-drying ink based on a plastic material including a black epoxy resin, an oil-based coating including a resin, an epoxy resin or an acrylic or a coating of a photocurable colloid mixed with an ink. Moreover, the concave-curved ring is formed after an appearance of the light absorbing layer solidifying, and the light absorbing layer is opaque. Therefore, the reflection condition of the stray light can be reduced, and the stability and the steady state of the light blocking sheet can be further increased, which are not affected by the external surroundings.

The imaging lens assembly module can further include a tip-end minimal opening structure circular symmetrical about the optical axis as a center, and the tip-end minimal opening structure is disposed on an object side of the light blocking element assembling surface, or disposed on one side of the object side and the image side of the optical lens element which is without additional one or more optical lens elements disposed thereon, wherein the tip-end minimal opening structure includes a first tapered surface and a second tapered surface. The first tapered surface is tapered from an object side of the imaging lens assembly module to the image side of the imaging lens assembly module, the second tapered surface is tapered from the image side of the imaging lens assembly module to the object side of the imaging lens assembly module, and the first tapered surface and the second tapered surface are intersected to form a tip-end minimal opening. In detail, a structure of the tip-end minimal opening structure and the light blocking sheet are cooperated to each other. The light absorbing layer used as the aperture stop can be disposed on a suitable position, wherein a shape of the first tapered surface and a shape of the second tapered surface are cooperated to a geometric shape of the light blocking sheet, and a light trap for absorbing the stray light can be formed. The light absorbing layer can be smoothly accumulated in a bottom of the light trap. Therefore, the steady state of the aperture stop can be promoted, and the possibility of the reflection of the stray light can be substantially reduced.

The light absorbing layer can be further disposed on the object-side surface of the light blocking sheet. Therefore, the light absorbing layer can be accumulated in a bottom of the second tapered surface, that is, a bottom of the light trap. Therefore, the possibility of the reflection of the stray light can be substantially reduced, and the efficiency of absorbing non-imaging light can be increased.

The light absorbing layer can be closer to the through hole of the light blocking sheet than the light blocking element assembling surface to the through hole of the light blocking sheet. Therefore, the efficiency for fixing the aperture stop via the light absorbing layer can be increased. The light absorbing layer can be farther from the through hole of the light blocking sheet than the light blocking element assembling surface from the through hole of the light blocking sheet. Furthermore, when the imaging lens assembly module is observed from a direction parallel to the optical axis to the image side, the light absorbing layer on the object-side surface of the light absorbing layer is shielded via the tip-end minimal opening structure. Therefore, it is favorable for being a glue-storage groove, and the glue-storage groove is for the light absorbing layer with a flow state accumulated as uneven thickness via a shielding condition. The tip-end minimal opening structure can be adjusted the surface characteristic thereof owing to be made of a plastic material, and the light absorbing layer with the flow state is with capillary effect. Cooperating with a shielding configuration of the tip-end minimal opening structure, the light absorbing layer with the flow state is accumulated as uneven thickness. The disposition of the glue-storage groove is to accumulate a portion of the light absorbing layer, most of the light absorbing layer can be stored in the glue-storage groove, and the excessive light absorbing layer can be avoided so as to a better adhesion between the light blocking sheet and the light blocking element assembling surface. An accumulation of the light absorbing layer is not occupied on the entire light blocking element assembling surface, and a condition of the light blocking sheet exclusively drifted on the light blocking element assembling surface can be reduced.

The outer peripheral portion of the optical lens element can further include an object-side receiving surface facing toward the object side of the optical lens element to be circular annular, and the object-side receiving surface is for being assembled with a lens barrel of the imaging lens assembly module. The lens barrel includes a vertical receiving surface contacted with the object-side receiving surface. Therefore, the object-side receiving surface of the optical lens element does not need to be connected to the light blocking sheet as the aperture stop to disperse the assembling stress of the entire optical element set, and the excessive stress is avoided to apply on the aperture stop to reduce the possibility of deterioration of the quality of the aperture stop.

The object-side receiving surface does not overlap with the light blocking element assembling surface in a direction parallel to the optical axis. Therefore, a range of applied force on a structure is staggered to avoid the light blocking sheet being affected via the optical element set during the assembling process.

The light blocking sheet does not overlap with the lens barrel in the direction parallel to the optical axis and toward the image side of the imaging lens assembly module. Therefore, it is favorable for reducing the complexity of the assembling process of the aperture stop, and the efficiency of manufacture can be promoted. Furthermore, an assembling direction of the aperture stop is consistent with an assembling direction of the optical element set to avoid increasing the cost of machinery, which is for turning the lens barrel during the assembling process.

The concave-curved ring can be recessed to an outer diameter surface of the light blocking sheet. Therefore, it is favorable for increasing the stability and the steady state of the light blocking sheet, which are not affected by the external surroundings. The light absorbing layer disposed on the object-side surface of the light blocking sheet can surround the through hole of the light blocking sheet, the concave-curved ring is formed, and the light blocking sheet is recessed to the light blocking element assembling surface. Therefore, it is favorable for increasing the efficiency for fixing the aperture stop via the light absorbing layer.

When a diameter of the tip-end minimal opening is $\psi d$, and a diameter of the through hole of the light blocking sheet is the following condition can be satisfied: $0.85<\psi d/\psi sa<1.15$. If a value of $\psi d/\psi sa$ is too high, the structure of an optical system is destroyed to affect a specification. If the value of $\psi d/\psi sa$ is too low, an efficiency of light blocking is decreased. Hence, $\psi d/\psi sa$ is remained in the proportion of the aforementioned range, and it is favorable for increasing the efficiency of blocking the stray light. Furthermore, the through hole of the light blocking sheet can be the aperture stop of the imaging lens assembly module, the through hole can be for controlling the amount of incoming light of the imaging lens assembly module, and an opening diameter of the through hole of the light blocking sheet can be an entrance pupil diameter of the imaging lens assembly module.

When the diameter of the through hole of the light blocking sheet is $\psi sa$, and an outer diameter of the light blocking sheet is $\psi sd$, the following condition can be satisfied: $0.08 \text{ mm}<(\psi sd-\psi sa)/2<0.5 \text{ mm}$. Therefore, it is favorable for maintaining the light blocking sheet with smaller dimension to be suitable for the imaging lens assembly module with partially compact, and an excessively unnecessary light blocking range can be reduced.

When the diameter of the through hole of the light blocking sheet is $\psi sa$, and the outer diameter of the light blocking sheet is $\psi sd$, the following condition can be satisfied: $0.1<(\psi sd-\psi sa)/\psi sa<0.4$. Therefore, an opening proportion of the light blocking sheet is for determine an aperture range of the aperture stop to effectively control a specification stability of the imaging lens assembly module.

Each of the aforementioned features of the imaging lens assembly module can be utilized in various combinations for achieving the corresponding effects.

The present disclosure provides a camera module, which includes the aforementioned imaging lens assembly module and an image sensor module, wherein the imaging lens assembly module is disposed on the image sensor module, and the image sensor module includes an image sensor.

The present disclosure provides an electronic device, which includes the aforementioned camera module. Therefore, it is favorable for promoting the image quality.

According to the aforementioned embodiment, specific examples are provided, and illustrated via figures.

1st Embodiment

Figure 1B:
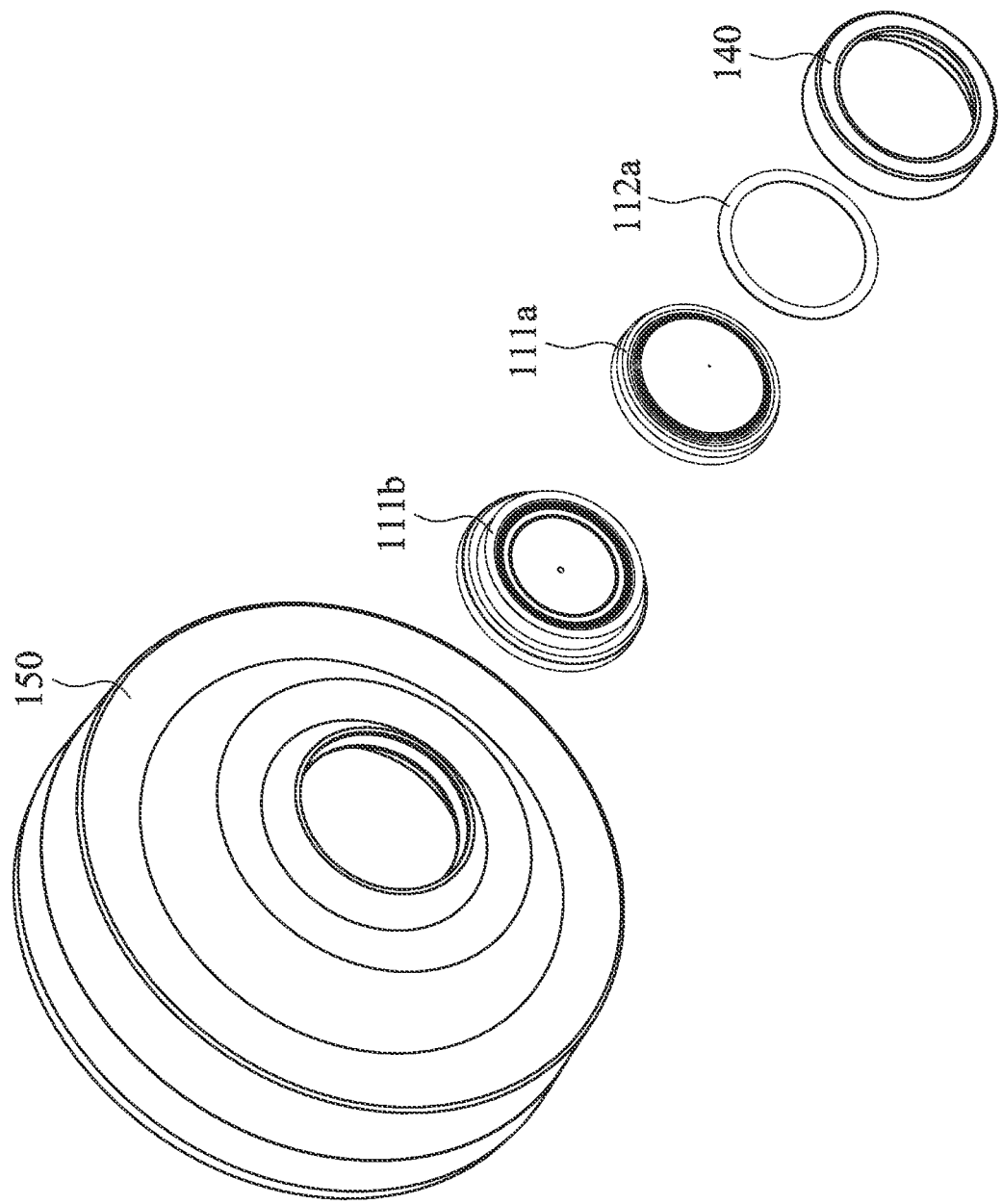
FIG. 1B is a partial exploded view of an imaging lens assembly module according to the 1st embodiment in FIG. 1A.
Figure 1C:
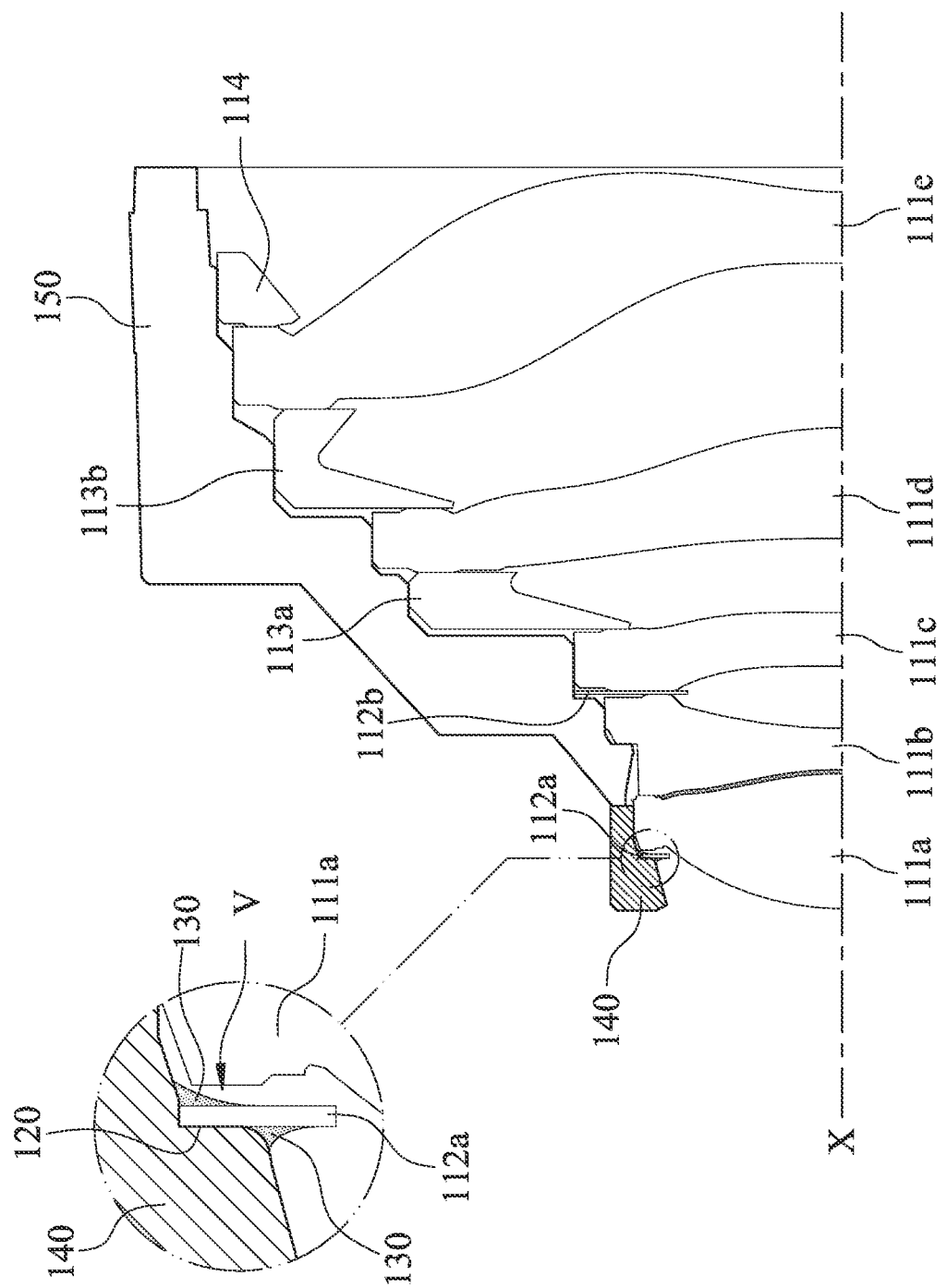
FIG. 1C is a partial enlarged view of the imaging lens assembly module according to the 1st embodiment in FIG. 1A.
Figure 1D:
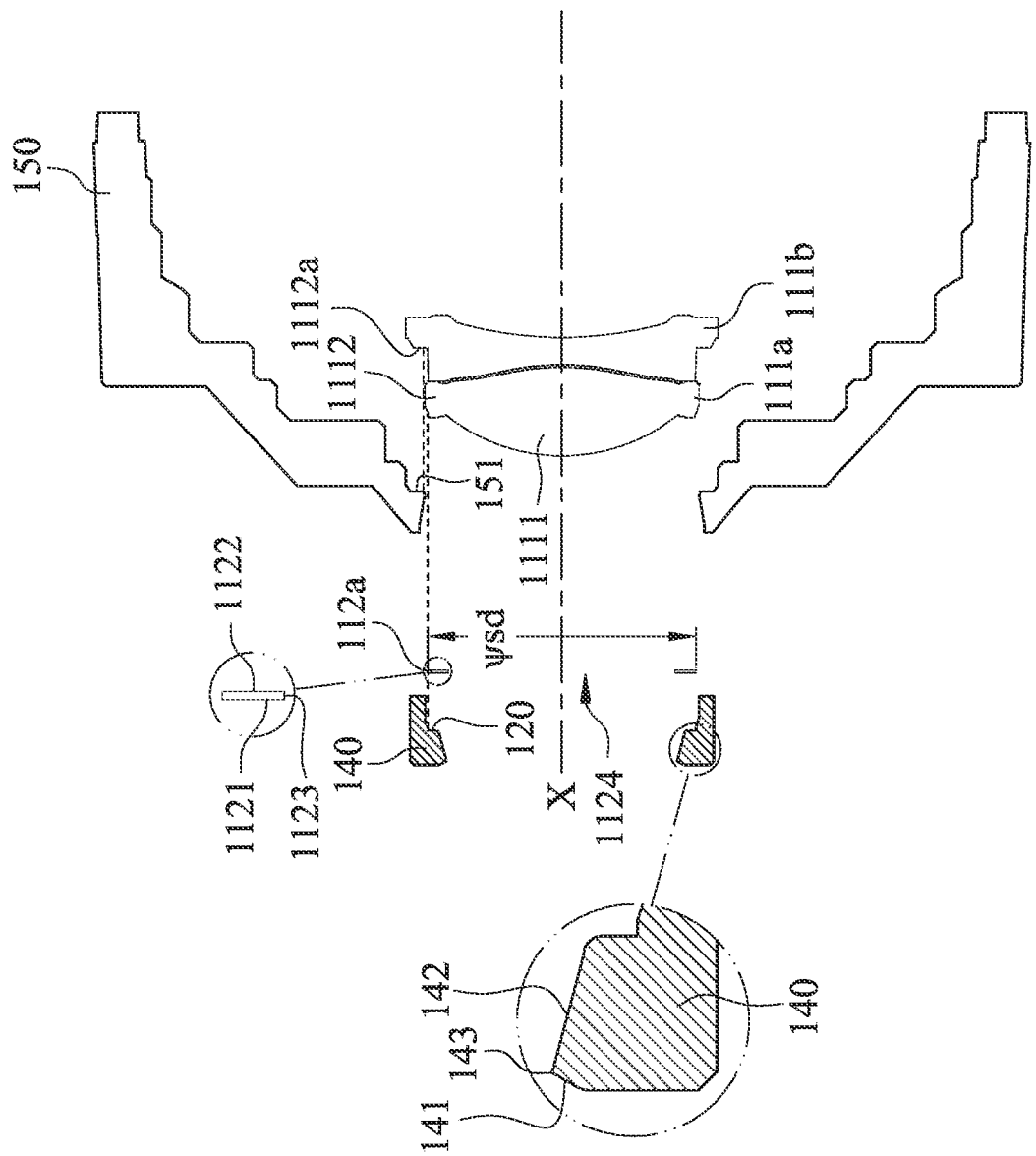
FIG. 1D is a schematic view of a partial optical element set, a lens barrel and a tip-end minimal opening structure of the imaging lens assembly module according to the 1st embodiment in FIG. 1A.

FIG. 1A is a schematic view of a camera module 10 according to the 1st embodiment of the present disclosure. FIG. 1B is a partial exploded view of an imaging lens assembly module according to the 1st embodiment in FIG. 1A. FIG. 1C is a partial enlarged view of the imaging lens assembly module according to the 1st embodiment in FIG. 1A. FIG. 1D is a schematic view of a partial optical element set, a lens barrel 150 and a tip-end minimal opening structure 140 of the imaging lens assembly module according to the 1st embodiment in FIG. 1A. In FIGS. 1A to 1D, the camera module 10 includes the imaging lens assembly module (its reference numeral is omitted) and an image sensor module (its reference numeral is omitted). The imaging lens assembly module has an optical axis X, and includes the optical element set (its reference numeral is omitted), a light blocking element assembling surface 120, a light absorbing layer 130, the tip-end minimal opening structure 140, the lens barrel 150 and an imaging surface 170. The optical element set is disposed in the lens barrel 150. The tip-end minimal opening structure 140 is located on an object side of the imaging lens assembly module. The lens barrel 150 is disposed on an image side of the tip-end minimal opening structure 140. The imaging surface 170 is located on an image side of the lens barrel 150. The image sensor module includes an image sensor 161, and the image sensor 161 is disposed on the imaging surface 170.

The optical element set includes at least one optical lens element and at least one light blocking sheet, and the optical element set can further include a plurality of spacers and a retainer 114. In detail, according to the 1st embodiment, the optical element set, in order from an object side to an image side, includes a light blocking sheet 112a, a first optical lens element 111a, a second optical lens element 111b, a light blocking sheet 112b, a third optical lens element 111c, a spacer 113a, a fourth optical lens element 111d, a spacer 113b, a fifth optical lens element 111e and the retainer 114.

In detail, the first optical lens element 111a and the second optical lens element 111b are bonded together to form a cemented lens element. When one of the first optical lens element 111a and the second optical lens element 111b is made of a plastic material, a material of the cemented lens element is regarded as the plastic material. When the first optical lens element 111a and the second optical lens element 111b are both made of a glass material, the material of the cemented lens element is regarded as the glass material, but is not limited thereto. The first optical lens element 111a and the second optical lens element 111b can be simultaneously fixed as long as one of the first optical lens element 111a and the second optical lens element 111b of the cemented lens element is assembled with the lens barrel 150.

In FIGS. 1C and 1D, the first optical lens element 111a, in order from the optical axis X to a peripheral region of the first optical lens element 111a, includes an optical effective portion 1111 and an outer peripheral portion 1112, wherein the outer peripheral portion 1112 surrounds the optical effective portion 1111. The light blocking sheet 112a is disposed on an object side of the outer peripheral portion 1112 of the first optical lens element 111a, and spaced apart from the outer peripheral portion 1112 of the first optical lens element 111a, that is, the light blocking sheet 112a is not contacted with the outer peripheral portion 1112 of the first optical lens element 111a. The light blocking sheet 112a includes an object-side surface 1121, an image-side surface 1122 and an inner opening surface 1123, wherein the inner opening surface 1123 surrounds a through hole 1124 of the light blocking sheet 112a, and the inner opening surface 1123 is connected to the object-side surface 1121 and the image-side surface 1122. According to the 1st embodiment, it should be mentioned that each light blocking sheet (including the light blocking sheet 112b) of the optical element set includes the object-side surface, the image-side surface and the inner opening surface, and the disposition thereof is the same as the light blocking sheet 112a. Also, each optical lens element (including the second optical lens element 111b, the third optical lens element 111c, the fourth optical lens element 111d, the fifth optical lens element 111e) includes the optical effective portion and the outer peripheral portion, and the disposition thereof is the same as the first optical lens element 111a. Hence, only the light blocking sheet 112a and the first optical lens element 111a are described herein.

Furthermore, according to the 1st embodiment, the through hole 1124 of the light blocking sheet 112a can be an aperture stop of the imaging lens assembly module for controlling the amount of incoming light of the imaging lens assembly module, and an opening diameter of the through hole 1124 of the light blocking sheet 112a can be an entrance pupil diameter of the imaging lens assembly module. Or, a tip-end minimal opening 143 of the tip-end minimal opening structure 140 can be the aperture stop of the imaging lens assembly module for suitable for an optical design of the front aperture stop. When the through hole 1124 of the light blocking sheet 112a is the aperture stop of the imaging lens assembly module, a position of the aperture stop can be appropriately adjusted by the disposition of the tip-end minimal opening structure 140.

In FIG. 1C, the light absorbing layer 130 is disposed on the image-side surface 1122 of the light blocking sheet 112a, wherein the light absorbing layer 130 is for fixing the light blocking sheet 112a on the light blocking element assembling surface 120, and a void V is maintained between the light blocking sheet 112a and the outer peripheral portion 1112 of the first optical lens element 111a. In detail, the light absorbing layer 130 is disposed between the tip-end minimal opening structure 140 and the light blocking sheet 112a, wherein the light blocking sheet 130 is for absorbing the stray light in the imaging lens assembly module, and the light absorbing layer 130 can be for fixing the light blocking sheet 112a on the light blocking element assembling surface 120, so that the precisely manufactured light blocking sheet 112a does not be compressed and destroyed via the first optical lens element 111a. Therefore, it is favorable for decreasing the misgiving which the light blocking sheet 112a is destroyed during the assembling process to ensure the better light blocking performance.

The tip-end minimal opening structure 140 is circular symmetrical about the optical axis X as a center, and the tip-end minimal opening structure 140 is disposed on an object side of the light blocking element assembling surface 120, wherein the tip-end minimal opening structure 140 includes a first tapered surface 141 and a second tapered surface 142, the first tapered surface 141 is tapered from an object side of the imaging lens assembly module to the image side of the imaging lens assembly module, the second tapered surface 142 is tapered from the image side of the imaging lens assembly module to the object side of the imaging lens assembly module, and the first tapered surface 141 and the second tapered surface 142 are intersected to form a tip-end minimal opening 143. In detail, the structure of the tip-end minimal opening structure 140 and the light blocking sheet 112a are cooperated to each other, the light absorbing layer 130 for disposing the aperture stop can be disposed on a suitable position to promote the steady state of the function of the aperture stop, and a shape of the first tapered surface 141 and a shape of the second tapered surface 142 are cooperated to a shape of the light blocking sheet 112a. Therefore, a light trap for absorbing the stray light is formed, and the light absorbing layer 130 can be accumulated in the bottom of the light trap to substantially reduce the possibility of the reflection of the stray light.

Figure 1E:
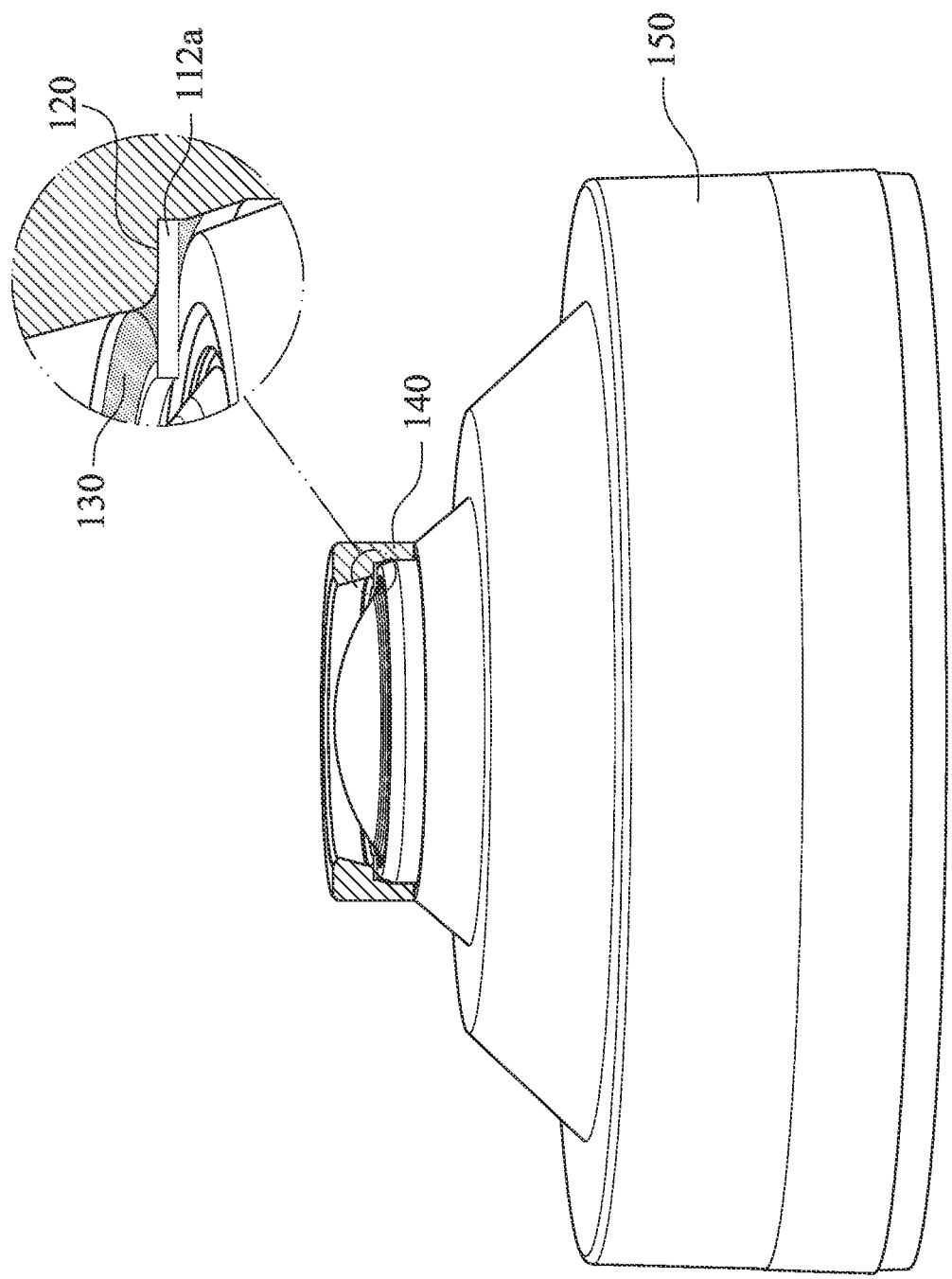
FIG. 1E is a cross-sectional view of the tip-end minimal opening structure of the imaging lens assembly module according to the 1st embodiment in FIG. 1A.
Figure 1F:
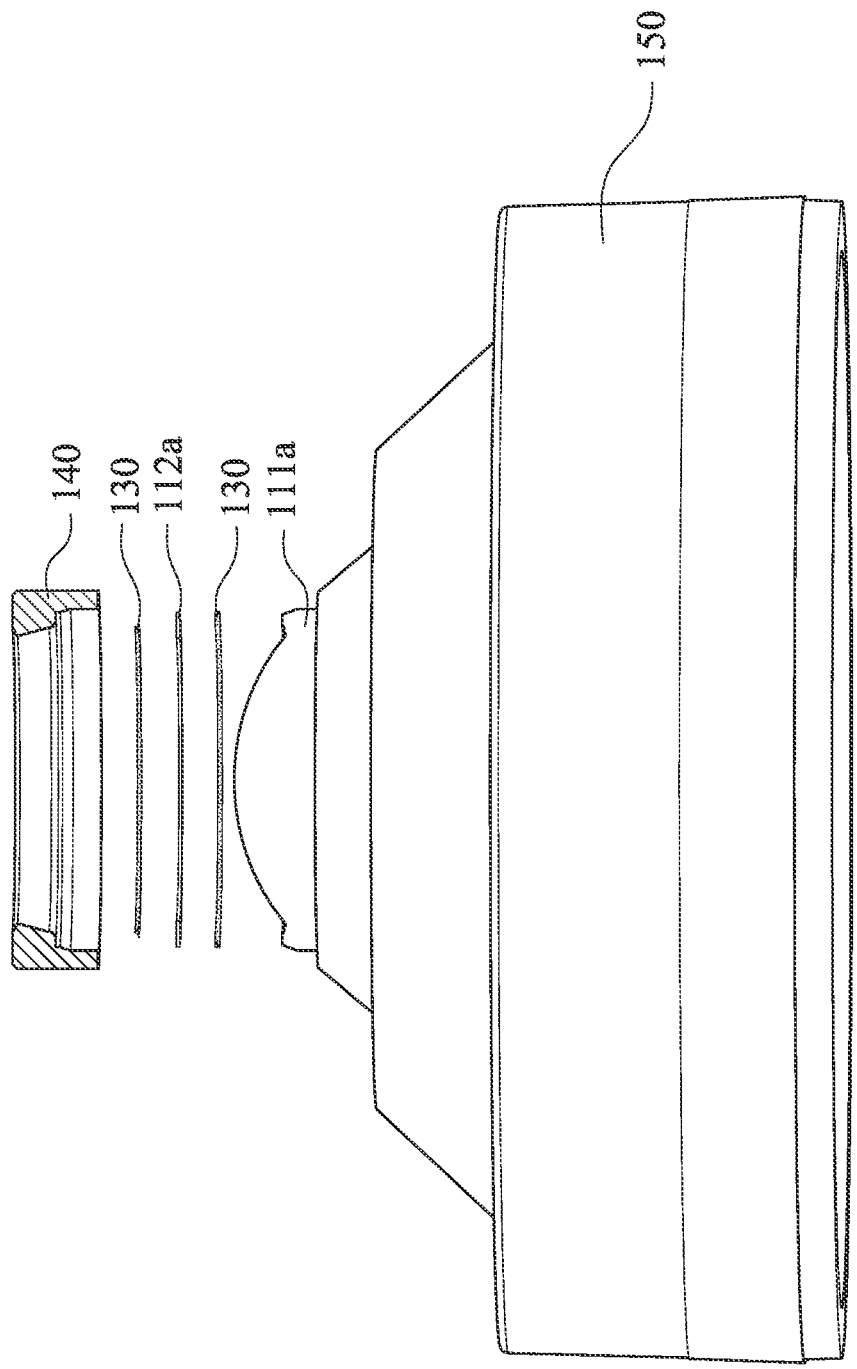
FIG. 1F is another partial exploded view of the imaging lens assembly module according to the 1st embodiment in FIG. 1A.

FIG. 1E is a cross-sectional view of the tip-end minimal opening structure 140 of the imaging lens assembly module according to the 1st embodiment in FIG. 1A. FIG. 1F is another partial exploded view of the imaging lens assembly module according to the 1st embodiment in FIG. 1A. In FIGS. 1E and 1F, the light blocking element assembling surface 120 is disposed on an object side of the light blocking sheet 112a, the light blocking element assembling surface 120 faces toward the image side of the imaging lens assembly module. The light blocking element assembling surface 120 is circular annular, and for the light blocking sheet 112a mounted thereon.

The light absorbing layer 130 can be further disposed on the object-side surface 1121 of the light blocking sheet 112a. Furthermore, the initial condition of the light absorbing layer 130 is a liquid, so that the light absorbing layer 130 has extensibility. Therefore, the light absorbing layer 130 extends and permeates to the object-side surface 1121 of the light blocking sheet 112a, and the light absorbing layer 130 can be accumulated in the bottom of the second tapered surface 142 to be a bottom of the light trap. Moreover, the concave-curved ring is formed after an appearance of the light absorbing layer 130 solidifying, and the light absorbing layer 130 is opaque. Therefore, the reflection condition of the stray light is substantially reduced, and the efficiency of absorbing the non-imaging light is increased.

The light absorbing layer 130 can be closer to the through hole 1124 of the light blocking sheet 112a than the light blocking element assembling surface 120 to the through hole 1124 of the light blocking sheet 112a, or the light absorbing layer 130 can be farther from the through hole 1124 of the light blocking sheet 112a than the light blocking element assembling surface 120 from the through hole 1124 of the light blocking sheet 112a. When the light absorbing layer 130 is closer to the through hole 1124 of the light blocking sheet 112a than the light blocking element assembling surface 120 to the through hole 1124 of the light blocking sheet 112a, the efficiency for fixing the aperture stop via the light absorbing layer 130 can be increased. When the light absorbing layer 130 is farther from the through hole 1124 of the light blocking sheet 112a than the light blocking element assembling surface 120 from the through hole 1124 of the light blocking sheet 112a, the imaging lens assembly module is observed from the direction parallel to the optical axis X to the image side of the imaging lens assembly module, the light absorbing layer 130 disposed on the object-side surface 1121 of the light blocking sheet 112a is shielded via the tip-end minimal opening structure 140.

In FIG. 1D, there is without additional one or more optical lens elements on an object side of the cemented lens element, and the outer peripheral portion 1112 of the second optical lens element 111b of the cemented lens element can further include an object-side receiving surface 1112a. The object-side receiving surface 1112a faces toward the object side of the second optical lens element 111b to be circular annular, and the object-side receiving surface 1112a is for being assembled with the lens barrel 150 of the imaging lens assembly module. The lens barrel 150 can further include a vertical receiving surface 151, and the vertical receiving surface 151 is contacted with the object-side receiving surface 1112a. In detail, the object-side surface 1112a of the second optical lens element 111b does not need to be connected to the through hole 1124 of the light blocking sheet 112a as the aperture stop. Therefore, it is favorable for dispersing the assembling stress of the entire optical element set, and the excessive stress is avoided to apply on the aperture stop to reduce the possibility of deterioration of the quality of the aperture stop.

The object-side receiving surface 1112a does not overlap with the light blocking element assembling surface 120 in a direction parallel to the optical axis X. Therefore, the range of applied force is staggered to avoid the light blocking sheet 112a being affected via the optical element set during the assembling process. The light blocking sheet 112a does not overlap with the lens barrel 150 in the direction parallel to the optical axis X and toward the image side of the imaging lens assembly module. Therefore, it is favorable for reducing the complexity of the assembling process of the aperture stop, and the efficiency of manufacture can be promoted. Furthermore, the assembling direction of the aperture stop is consistent with the assembling direction of the optical element set to avoid increasing the cost of machinery, which is for turning the lens barrel 150 during the assembling process.

In FIGS. 1A and 1D, according to the 1st embodiment, when a diameter of the tip-end minimal opening 143 is ψd, a diameter of the through hole 1124 of the light blocking sheet 112a is ψsa, and an outer diameter of the light blocking sheet 112a is ψsd, the following condition of the Table 1 is satisfied.

TABLE 1

| 1st embodiment | | | |
|---|---|---|---|
| ψd (mm) | 1.7 | ψd/ψsa | 1.03 |
| ψsa (mm) | 1.65 | (ψsd − ψsa)/2 (mm) | 0.17 |
| ψsd (mm) | 1.98 | (ψsd − ψsa)/ψsa | 0.20 |

2nd Embodiment

Figure 2A:
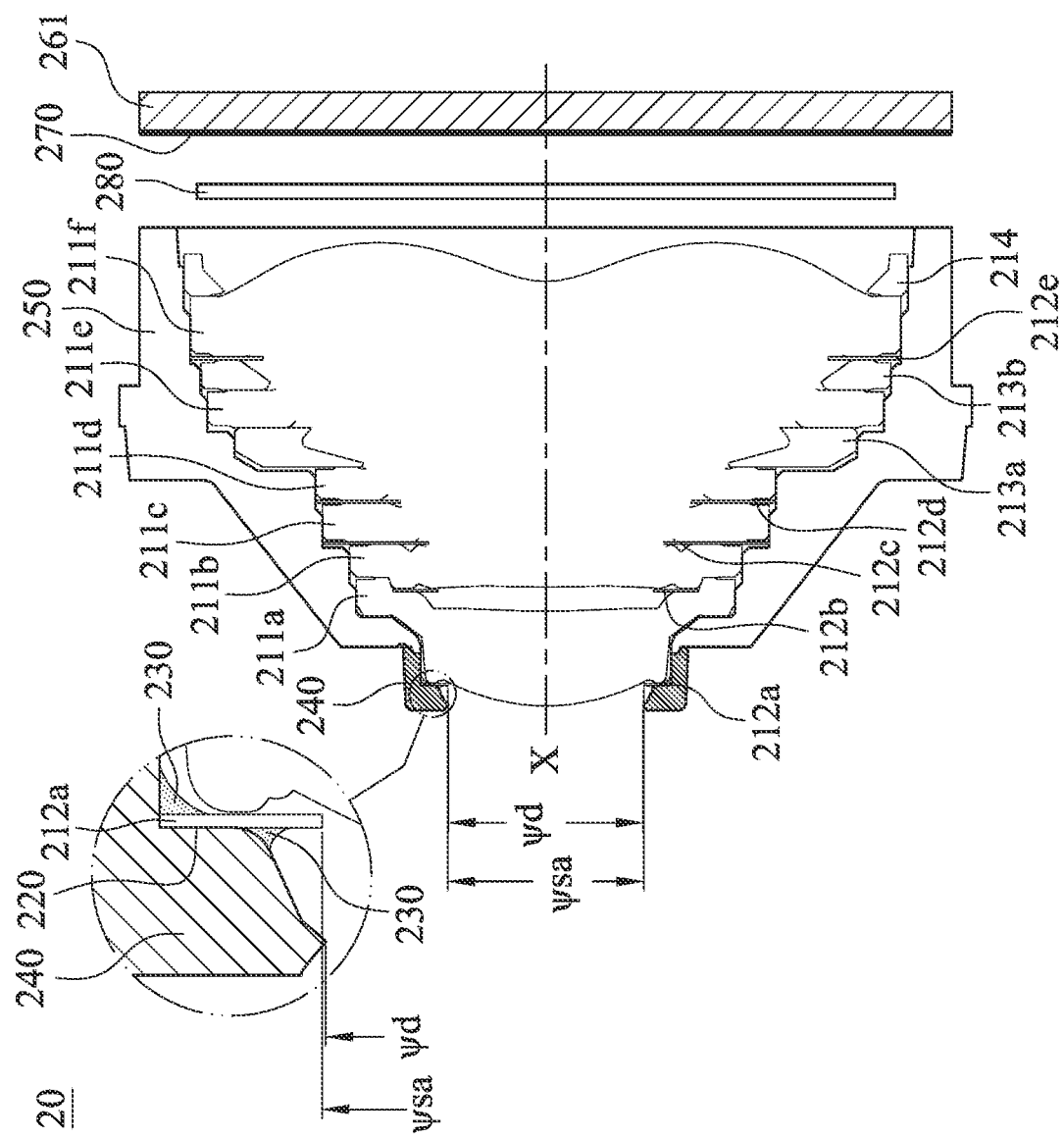
FIG. 2A is a schematic view of a camera module according to the 2nd embodiment of the present disclosure.
Figure 2B:
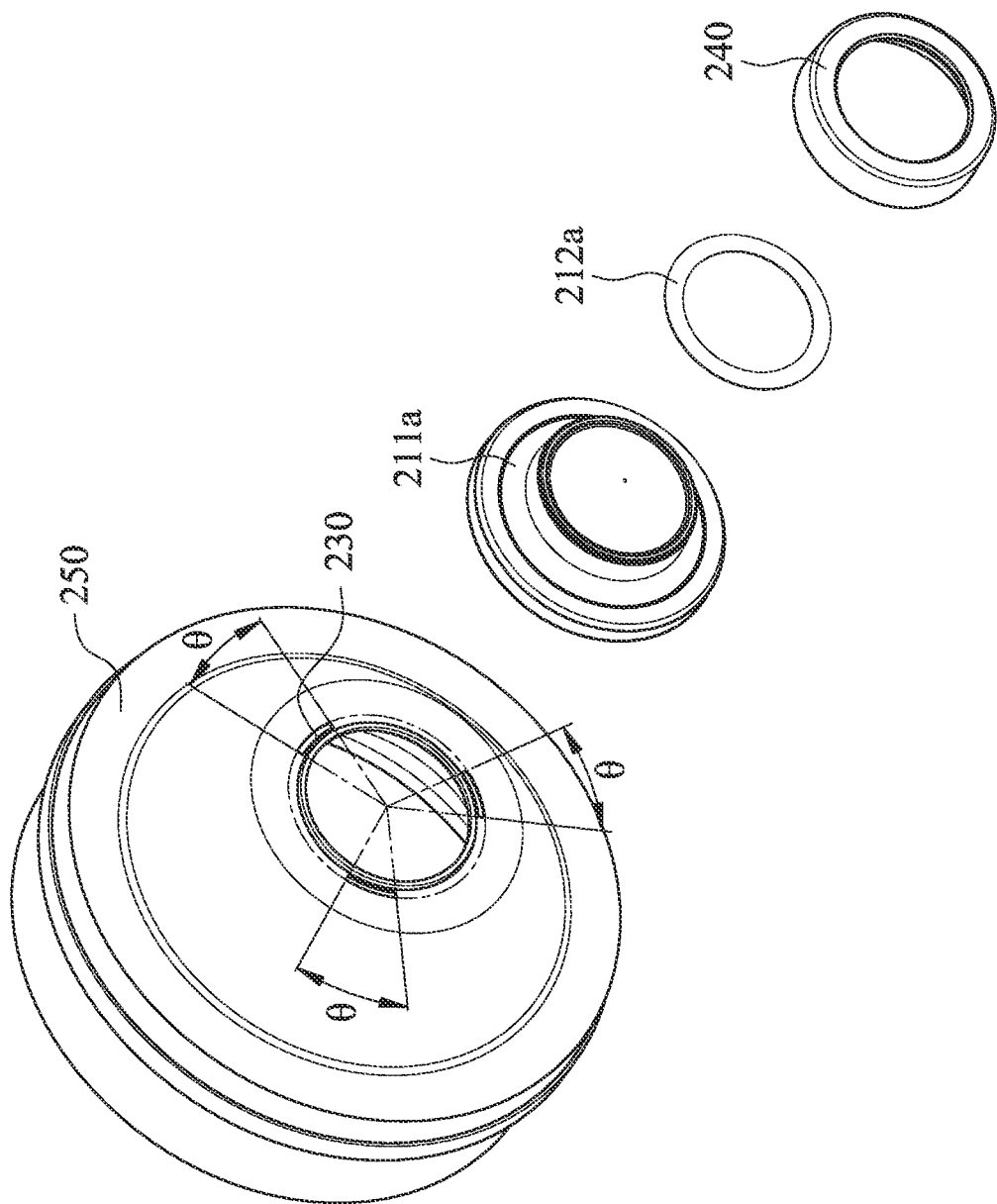
FIG. 2B is a partial exploded view of an imaging lens assembly module according to the 2nd embodiment in FIG. 2A.
Figure 2C:
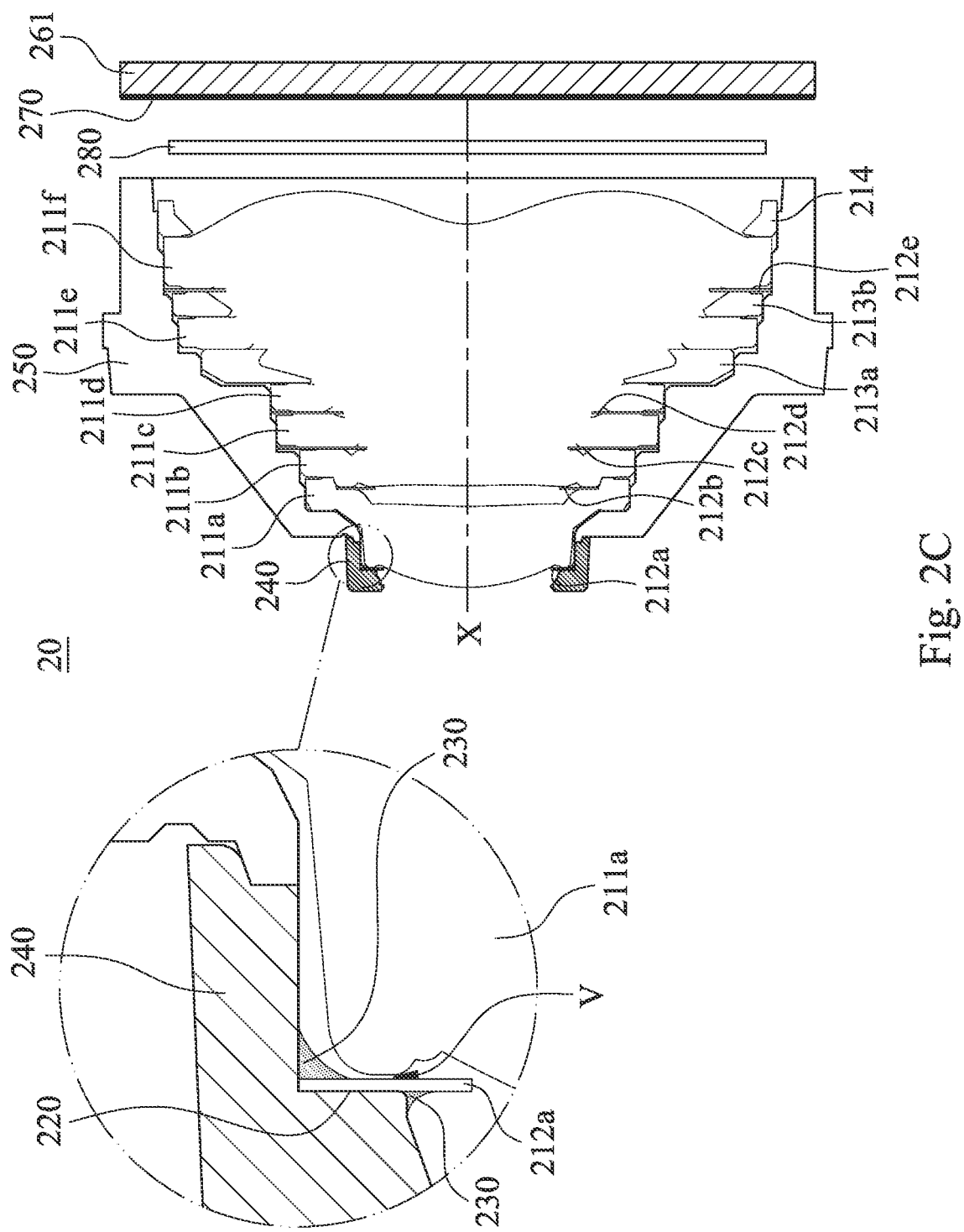
FIG. 2C is a partial enlarged view of the imaging lens assembly module according to the 2nd embodiment in FIG. 2A.
Figure 2D:
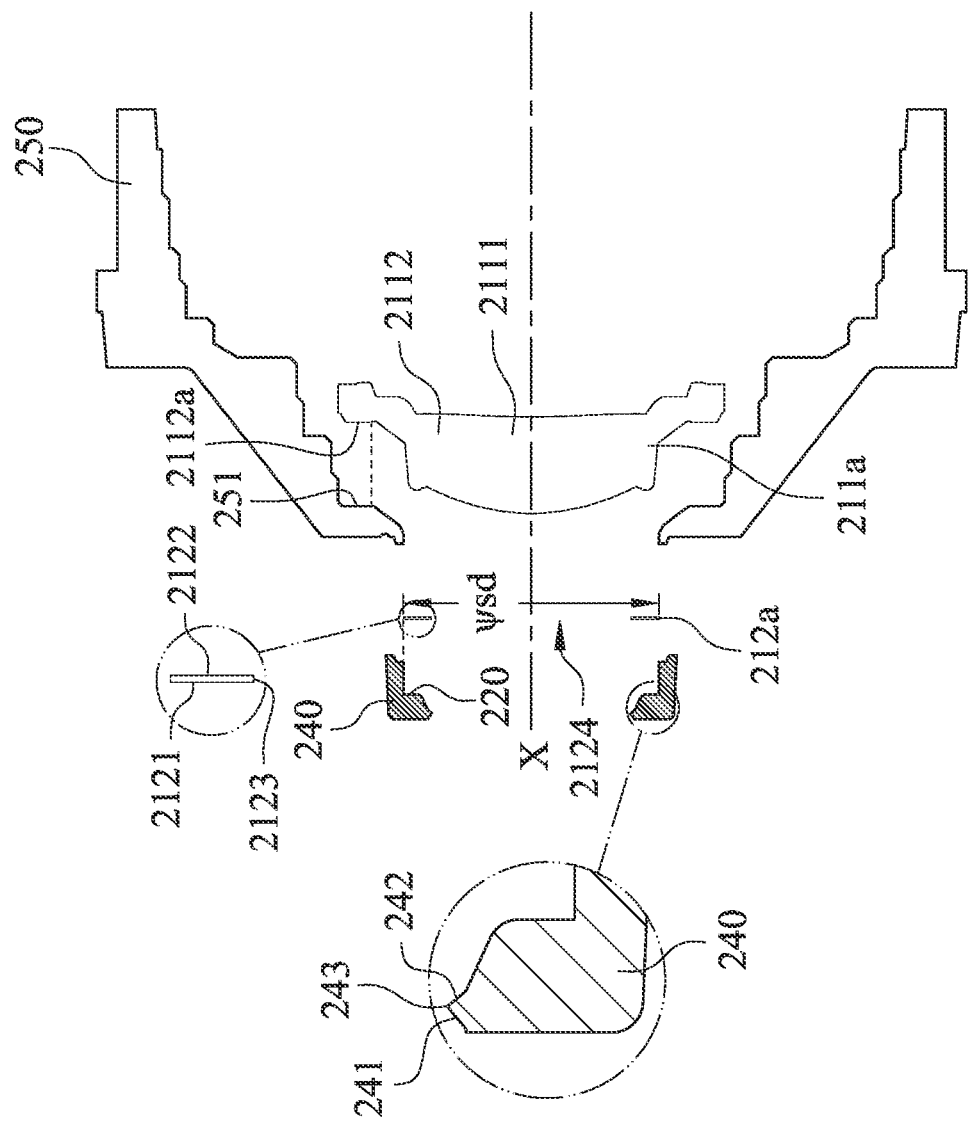
FIG. 2D is a schematic view of a partial optical element set, a lens barrel and a tip-end minimal opening structure of the imaging lens assembly module according to the 2nd embodiment in FIG. 2A.

FIG. 2A is a schematic view of a camera module 20 according to the 2nd embodiment of the present disclosure. FIG. 2B is a partial exploded view of an imaging lens assembly module according to the 2nd embodiment in FIG. 2A. FIG. 2C is a partial enlarged view of the imaging lens assembly module according to the 2nd embodiment in FIG. 2A. FIG. 2D is a schematic view of a partial optical element set, a lens barrel 250 and a tip-end minimal opening structure 240 of the imaging lens assembly module according to the 2nd embodiment in FIG. 2A. In FIGS. 2A to 2D, the camera module 20 includes the imaging lens assembly module (its reference numeral is omitted) and an image sensor module (its reference numeral is omitted). The imaging lens assembly module has an optical axis X, and includes the optical element set (its reference numeral is omitted), a light blocking element assembling surface 220, a light absorbing layer 230, the tip-end minimal opening structure 240, the lens barrel 250, an imaging surface 270, and a filter element 280. The optical element set is disposed in the lens barrel 250. The tip-end minimal opening structure 240 is located on an object side of the imaging lens assembly module. The lens barrel 250 is disposed on an image side of the tip-end minimal opening structure 240. The imaging surface 270 is located on an image side of the lens barrel 250. The image sensor module includes an image sensor 261, and the image sensor 261 is disposed on the imaging surface 270.

The optical element set includes at least one optical lens element and at least one light blocking sheet, and the optical element set can further include a plurality of spacers and a retainer 214. In detail, according to the 2nd embodiment, the optical element set, in order from an object side to an image side, includes a light blocking sheet 212a, a first optical lens element 211a, a light blocking sheet 212b, a second optical lens element 211b, a light blocking sheet 212c, a third optical lens element 211c, a light blocking sheet 212d, a fourth optical lens element 211d, a spacer 213a, a fifth optical lens element 211e, a spacer 213b, a light blocking sheet 212e, a sixth optical lens element 211f and the retainer 214. Furthermore, structures, surface shapes and so on of the second optical lens element 211b, the third optical lens element 211c, the fourth optical lens element 211d, the fifth optical lens element 211e and the sixth optical lens element 211f can be disposed according to different imaging demand, and the structures, the surface shapes and so on are not important to the present disclosure, and will not disclose details thereof herein.

In FIGS. 2C and 2D, the first optical lens element 211a, in order from the optical axis X to a peripheral region of the first optical lens element 211a, includes an optical effective portion 2111 and an outer peripheral portion 2112, wherein the outer peripheral portion 2112 surrounds the optical effective portion 2111. The light blocking sheet 212a is disposed on an object side of the outer peripheral portion 2112 of the first optical lens element 211a, and spaced apart from the outer peripheral portion 2112 of the first optical lens element 211a, that is, the light blocking sheet 212a is not contacted with the outer peripheral portion 2112 of the first optical lens element 211a. The light blocking sheet 212a includes an object-side surface 2121, an image-side surface 2122 and an inner opening surface 2123, wherein the inner opening surface 2123 surrounds a through hole 2124 of the light blocking sheet 212a, and the inner opening surface 2123 is connected to the object-side surface 2121 and the image-side surface 2122. According to the 2nd embodiment, it should be mentioned that each light blocking sheet (including the light blocking sheets 212b, 212c, 212d, 212e) of the optical element set includes the object-side surface, the image-side surface and the inner opening surface, and the disposition thereof is the same as the light blocking sheet 212a. Also, each optical lens element (including the second optical lens element 211b, the third optical lens element 211c, the fourth optical lens element 211d, the fifth optical lens element 211e, the sixth optical lens element 211f) includes the optical effective portion and the outer peripheral portion, and the disposition thereof is the same as the first optical lens element 211a. Hence, only the light blocking sheet 212a and the first optical lens element 211a are described herein.

In FIG. 2C, the light absorbing layer 230 is disposed on the image-side surface 2122 of the light blocking sheet 212a, wherein the light absorbing layer 230 is for fixing the light blocking sheet 212a on the light blocking element assembling surface 220, and a void V is maintained between the light blocking sheet 212a and the outer peripheral portion 2112 of the first optical lens element 211a. In detail, the light absorbing layer 230 is for absorbing the stray light in the imaging lens assembly module, and the light absorbing layer 230 can be for fixing the light blocking sheet 212a on the light blocking element assembling surface 220, so that the precisely manufactured light blocking sheet 212a does not be compressed and destroyed via the first optical lens element 211a. Therefore, it is favorable for decreasing the misgiving which the light blocking sheet 212a is destroyed during the assembling process to ensure the better light blocking performance. Hence, the light absorbing layer 230 can further be an aperture stop of the imaging lens assembly module to promote the optical quality of the aperture stop.

The tip-end minimal opening structure 240 is circular symmetrical about the optical axis X as a center, and the tip-end minimal opening structure 240 is disposed on an object side of the light blocking element assembling surface 220, wherein the tip-end minimal opening structure 240 includes a first tapered surface 241 and a second tapered surface 242, the first tapered surface 241 is tapered from an object side of the imaging lens assembly module to the image side of the imaging lens assembly module, the second tapered surface 242 is tapered from the image side of the imaging lens assembly module to the object side of the imaging lens assembly module, and the first tapered surface 241 and the second tapered surface 242 are intersected to form a tip-end minimal opening 243. In detail, the structure of the tip-end minimal opening structure 240 and the light blocking sheet 212a are cooperated to each other, the light absorbing layer 230 for disposing the aperture stop can be disposed on a suitable position to promote the steady state of the function of the aperture stop, and a shape of the first tapered surface 241 and a shape of the second tapered surface 242 are cooperated to a shape of the light blocking sheet 212a. Therefore, a light trap for absorbing the stray light is formed, and the light absorbing layer 230 can be accumulated in the bottom of the light trap to substantially reduce the possibility of the reflection of the stray light.

FIG. 2E is a cross-sectional view of the tip-end minimal opening structure 240 of the imaging lens assembly module according to the 2nd embodiment in FIG. 2A. In FIG. 2E, the light blocking element assembling surface 220 is disposed on an object side of the light blocking sheet 212a, the light blocking element assembling surface 220 faces toward the image side of the imaging lens assembly module. The light blocking element assembling surface 220 is circular annular, and for the light blocking sheet 212a mounted thereon.

In FIGS. 2B and 2C, the light absorbing layer 230 surrounds the through hole 2124 of the light blocking sheet 212a to form a concave-curved ring, and the light absorbing layer 230 can be further disposed on the object-side surface 2121 of the light blocking sheet 212a. Therefore, it is favorable for increasing the efficiency of absorbing the non-imaging light. Furthermore, the concave-curved ring is recessed to an outer diameter surface of the light blocking sheet 212a. Therefore, it is favorable for increasing the stability and the steady state of the light blocking sheet 212a, which are not affected by the external surroundings.

In detail, the initial condition of the light absorbing layer 230 is a liquid, so the light absorbing layer 230 has extensibility. Therefore, the light absorbing layer 230 extends and permeates to the object-side surface 2121 of the light blocking sheet 212a, and the light absorbing layer 230 can be accumulated in the bottom of the second tapered surface 242 to be a bottom of the light trap. The light absorbing layer 230 can be made of a quick-drying ink based on a plastic material including a black epoxy resin, an oil-based coating including a resin, an epoxy resin or an acrylic or a coating of a photocurable colloid mixed with an ink. Moreover, the concave-curved ring is formed after an appearance of the light absorbing layer 230 solidifying, and the light absorbing layer 230 is opaque. Therefore, the reflection condition of the stray light can be substantially reduced, and the efficiency of absorbing the non-imaging light is increased. In FIG. 2B, the light absorbing layer 230 is made of a black glue to form a black glue groove, and each portion of the black glue groove has a radian 8. According to the 2nd embodiment, the radian 8 is 30 degrees. A disposition of the black glue groove is favorable for increasing a design margin of adjusting a method of dispensing and the disposition of the black glue groove. Therefore, an original dispensing method is limited by the manufacturing process or a variation of the structure of the lens barrel 250, the black glue groove can be still modified to facilitate the disposition of the black glue groove, but is not limited thereto.

The light absorbing layer 230 can be closer to the through hole 2124 of the light blocking sheet 212a than the light blocking element assembling surface 220 to the through hole 2124 of the light blocking sheet 212a, or the light absorbing layer 230 can be farther from the through hole 2124 of the light blocking sheet 212a than the light blocking element assembling surface 220 from the through hole 2124 of the light blocking sheet 212a. When the light absorbing layer 230 is closer to the through hole 2124 of the light blocking sheet 212a than the light blocking element assembling surface 220 to the through hole 2124 of the light blocking sheet 212a, the efficiency for fixing the aperture stop via the light absorbing layer 230 can be increased. When the light absorbing layer 230 is farther from the through hole 2124 of the light blocking sheet 212a than the light blocking element assembling surface 220 from the through hole 2124 of the light blocking sheet 212a, the imaging lens assembly module is observed from the direction parallel to the optical axis X to the image side of the imaging lens assembly module, the light absorbing layer 230 disposed on the object-side surface 2121 of the light blocking sheet 212a is shielded via the tip-end minimal opening structure 240.

In FIG. 2D, there is without additional one or more optical lens elements on an object side of the first optical lens element 211a, and the outer peripheral portion 2112 of the first optical lens element 211a can further include an object-side receiving surface 2112a. The object-side receiving surface 2112a faces toward the object side of the first optical lens element 211a to be circular annular, and the object-side receiving surface 2112a is for being assembled with the lens barrel 250 of the imaging lens assembly module. The lens barrel 250 can further include a vertical receiving surface 251, and the vertical receiving surface 251 is contacted with the object-side receiving surface 2112a. In detail, the object-side surface 2112a of the first optical lens element 211a does not need to be connected to the through hole 2124 of the light blocking sheet 212a. Therefore, it is favorable for dispersing the assembling stress of the entire optical element set.

The object-side receiving surface 2112a does not overlap with the light blocking element assembling surface 220 in a direction parallel to the optical axis X. Therefore, the range of applied force is staggered to avoid the light blocking sheet 212a being affected via the optical element set during the assembling process. The light blocking sheet 212a does not overlap with the lens barrel 250 in the direction parallel to the optical axis X and toward the image side of the imaging lens assembly module. Therefore, it is favorable for reducing the complexity of the assembling process of the aperture stop, and the efficiency of manufacture can be promoted. Furthermore, the assembling direction of the aperture stop is consistent with the assembling direction of the optical element set to avoid increasing the cost of machinery, which is for turning the lens barrel 250 during the assembling process.

In FIGS. 2A and 2D, according to the 2nd embodiment, every definition of ever parameter is the same as the 1st embodiment, and will not be described again herein. Please refer to the Table 2.

TABLE 2

| 2nd embodiment | | | |
|---|---|---|---|
| $\psi d$ (mm) | 1.44 | $\psi d/\psi sa$ | 0.99 |
| $\psi sa$ (mm) | 1.45 | $(\psi sd - \psi sa)/2$ (mm) | 0.20 |
| $\psi sd$ (mm) | 1.85 | $(\psi sd - \psi sa)/\psi sa$ | 0.28 |

3rd Embodiment

Figure 3A:
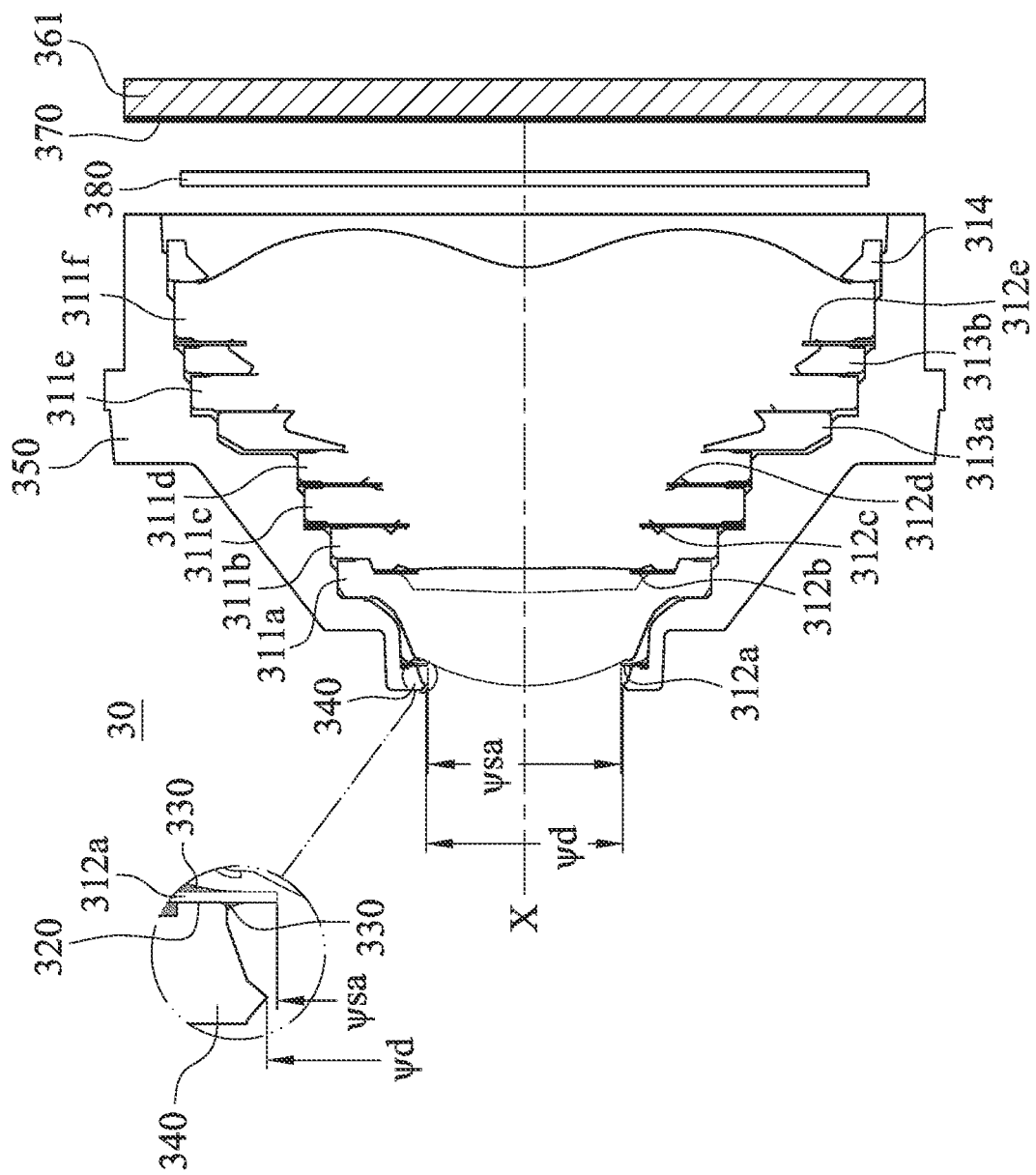
FIG. 3A is a schematic view of a camera module according to the 3rd embodiment of the present disclosure.

FIG. 3A is a schematic view of a camera module 30 according to the 3rd embodiment of the present disclosure.

Figure 3B:
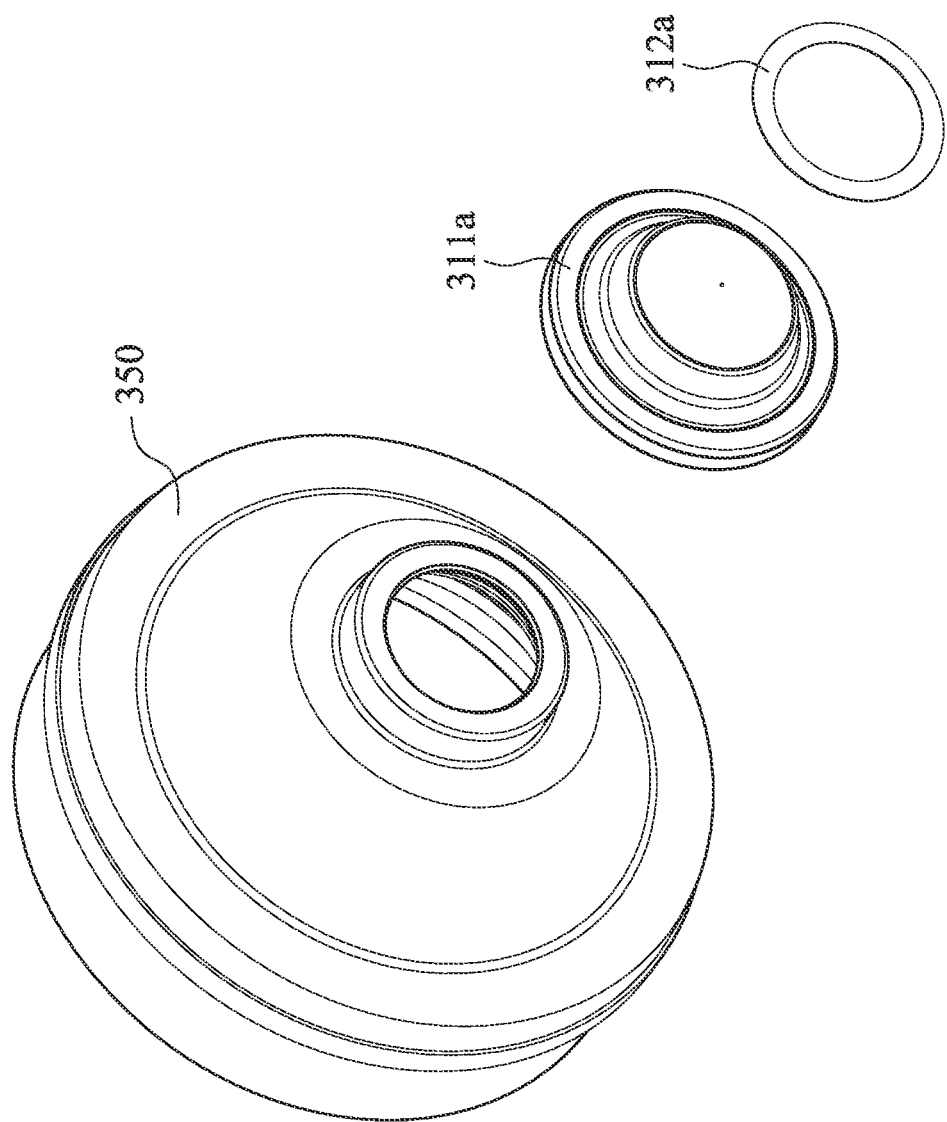
FIG. 3B is a partial exploded view of an imaging lens assembly module according to the 3rd embodiment in FIG. 3A.
Figure 3C:
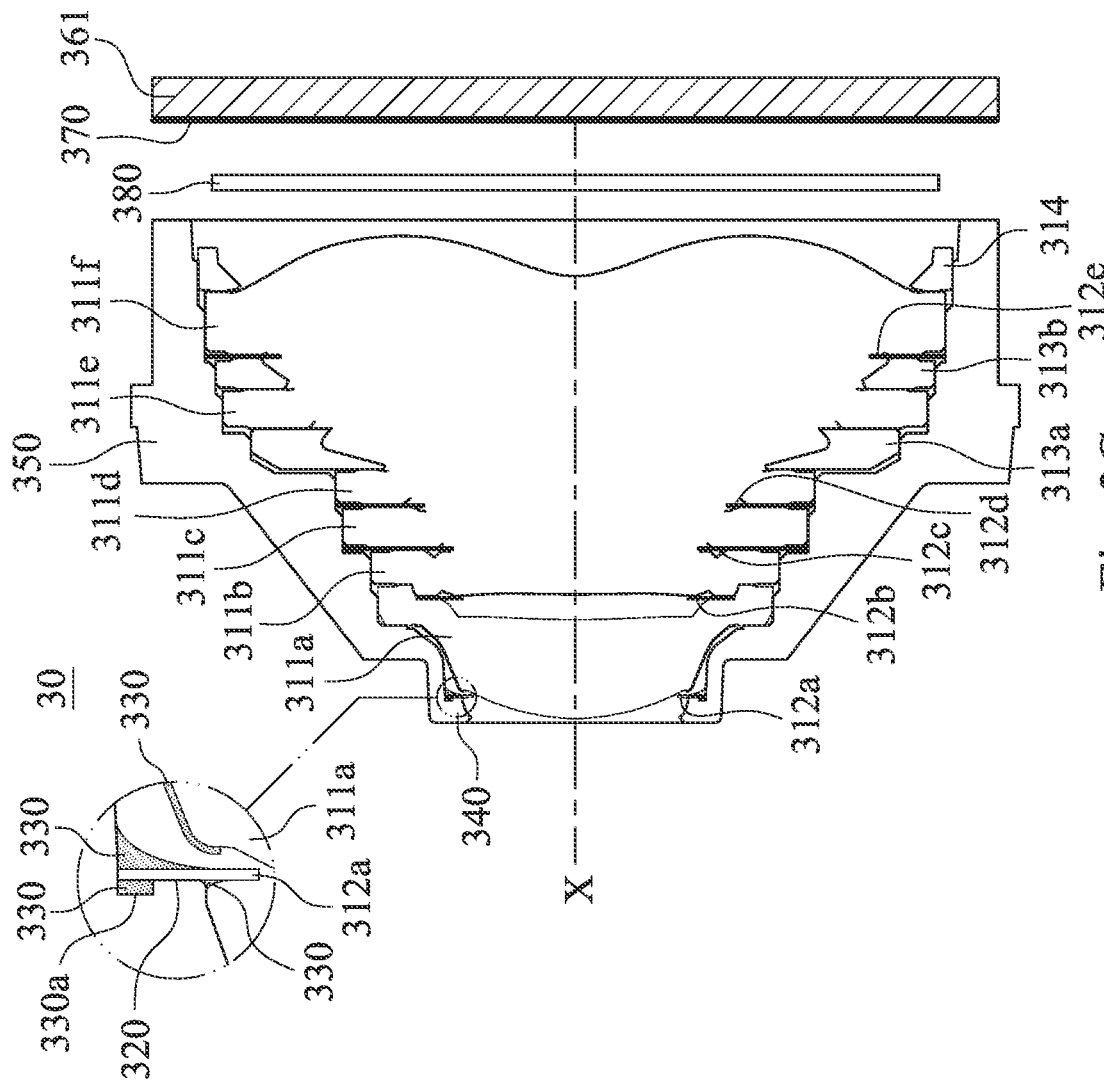
FIG. 3C is a partial exploded view of an imaging lens assembly module according to the 3rd embodiment in FIG. 3A.
Figure 3D:
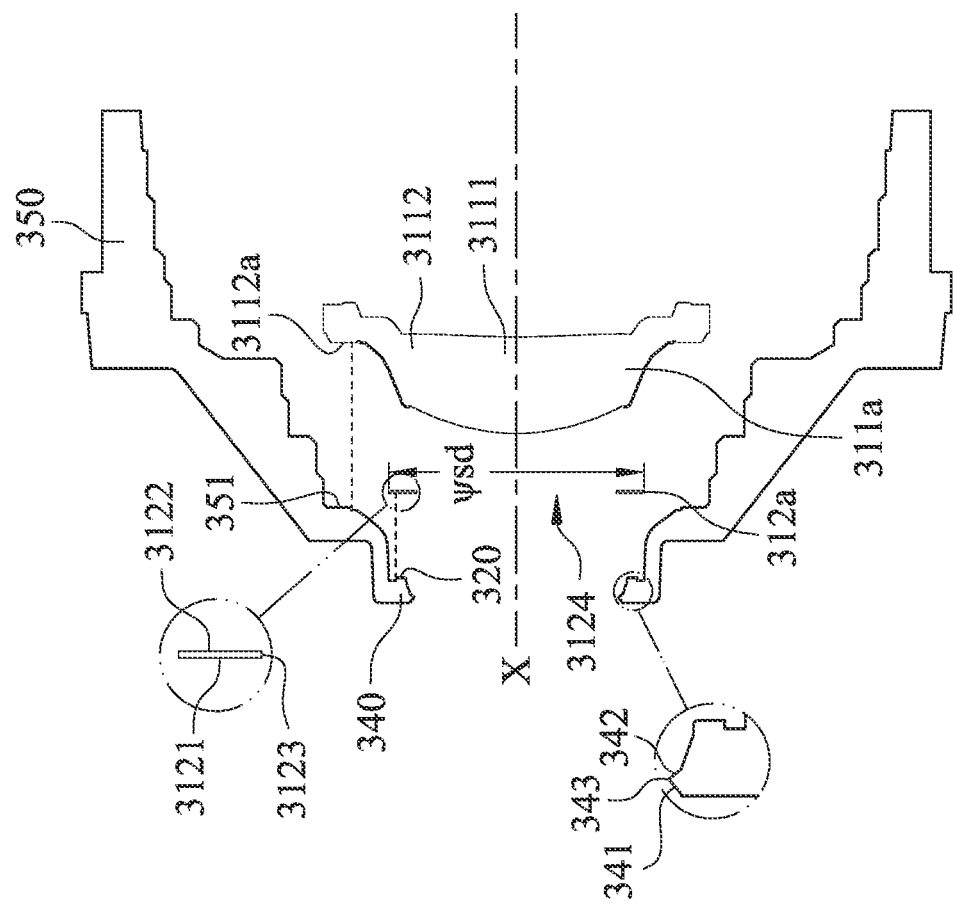
FIG. 3D is a schematic view of a partial optical element set, a lens barrel and a tip-end minimal opening structure of the imaging lens assembly module according to the 3rd embodiment in FIG. 3A.

FIG. 3B is a partial exploded view of an imaging lens assembly module according to the 3rd embodiment in FIG. 3A. FIG. 3C is a partial exploded view of an imaging lens assembly module according to the 3rd embodiment in FIG. 3A. FIG. 3D is a schematic view of a partial optical element set, a lens barrel 350 and a tip-end minimal opening structure 340 of the imaging lens assembly module according to the 3rd embodiment in FIG. 3A. In FIGS. 3A to 3D, the camera module 30 includes the imaging lens assembly module (its reference numeral is omitted) and an image sensor module (its reference numeral is omitted). The imaging lens assembly module has an optical axis X, and includes the optical element set (its reference numeral is omitted), a light blocking element assembling surface 320, a light absorbing layer 330, the tip-end minimal opening structure 340, the lens barrel 350, an imaging surface 370 and a filter element 380. The optical element set is disposed in the lens barrel 350. The tip-end minimal opening structure 340 is located on an object side of the imaging lens assembly module. The lens barrel 350 is disposed on an image side of the tip-end minimal opening structure 340. The imaging surface 370 is located on an image side of the lens barrel 350. The image sensor module includes an image sensor 361, and the image sensor 361 is disposed on the imaging surface 370.

The optical element set includes at least one optical lens element and at least one light blocking sheet, and the optical element set can further include a plurality of spacers and a retainer 314. In detail, according to the 3rd embodiment, the optical element set, in order from an object side to an image side, includes a light blocking sheet 312a, a first optical lens element 311a, a light blocking sheet 312b, a second optical lens element 311b, a light blocking sheet 312c, a third optical lens element 311c, a light blocking sheet 312d, a fourth optical lens element 311d, a spacer 313a, a fifth optical lens element 311e, a spacer 313b, a light blocking sheet 312e, a sixth optical lens element 311f and the retainer 314. Furthermore, structures, surface shapes and so on of the second optical lens element 311b, the third optical lens element 311c, the fourth optical lens element 311d, the fifth optical lens element 311e and the sixth optical lens element 311f can be disposed according to different imaging demand, and the structures, the surface shapes and so on are not important to the present disclosure, and will not disclose details thereof herein.

In FIGS. 3C and 3D, the first optical lens element 311a, in order from the optical axis X to a peripheral region of the first optical lens element 311a, includes an optical effective portion 3111 and an outer peripheral portion 3112, wherein the outer peripheral portion 3112 surrounds the optical effective portion 3111. The light blocking sheet 312a is disposed on an object side of the outer peripheral portion 3112 of the first optical lens element 311a, and spaced apart from the outer peripheral portion 3112 of the first optical lens element 311a, that is, the light blocking sheet 312a is not contacted with the outer peripheral portion 3112 of the first optical lens element 311a. The light blocking sheet 312a includes an object-side surface 3121, an image-side surface 3122 and an inner opening surface 3123, wherein the inner opening surface 3123 surrounds a through hole 3124 of the light blocking sheet 312a, and the inner opening surface 3123 is connected to the object-side surface 3121 and the image-side surface 3122. According to the 3rd embodiment, it should be mentioned that each light blocking sheet (including the light blocking sheets 312b, 312c, 312d, 312e) of the optical element set includes the object-side surface, the image-side surface and the inner opening surface, and the disposition thereof is the same as the light blocking sheet 312a. Also, each optical lens element (including the second optical lens element 311b, the third optical lens element 311c, the fourth optical lens element 311d, the fifth optical lens element 311e, the sixth optical lens element 311f) includes the optical effective portion and the outer peripheral portion, and the disposition thereof is the same as the first optical lens element 311a. Hence, only the light blocking sheet 312a and the first optical lens element 311a are described herein.

Furthermore, according to the 3rd embodiment, the through hole 3124 of the light blocking sheet 312a is an aperture stop of the imaging lens assembly module for controlling the amount of incoming light of the imaging lens assembly module, and an opening diameter of the through hole 3124 of the light blocking sheet 312a can be an entrance pupil diameter of the imaging lens assembly module. When the through hole 3124 of the light blocking sheet 312a is the aperture stop of the imaging lens assembly module, a position of the aperture stop can be appropriately adjusted by the disposition of the tip-end minimal opening structure 340.

In FIG. 3C, the light absorbing layer 330 is disposed on the image-side surface 3122 of the light blocking sheet 312a, wherein the light absorbing layer 330 is for fixing the light blocking sheet 312a on the light blocking element assembling surface 320. In detail, the light absorbing layer 330 is disposed between the tip-end minimal opening structure 340 and the light blocking sheet 312a, wherein the light absorbing layer 330 is for absorbing the stray light in the imaging lens assembly module, and the light absorbing layer 330 can be for fixing the light blocking sheet 312a on the light blocking element assembling surface 320, so that the precisely manufactured light blocking sheet 312a does not be compressed and destroyed via the first optical lens element 311a, and the light absorbing layer 330 after solidifying can be for stably disposing the light blocking sheet 312a on the lens barrel 350, that is, on the light blocking element assembling surface 320. Therefore, it is favorable for decreasing the misgiving which the light blocking sheet 312a is destroyed during the assembling process to ensure the better light blocking performance.

The tip-end minimal opening structure 340 is circular symmetrical about the optical axis X as a center, and the tip-end minimal opening structure 340 is disposed on an object side of the light blocking element assembling surface 320, wherein the tip-end minimal opening structure 340 includes a first tapered surface 341 and a second tapered surface 342, the first tapered surface 341 is tapered from an object side of the imaging lens assembly module to the image side of the imaging lens assembly module, the second tapered surface 342 is tapered from the image side of the imaging lens assembly module to the object side of the imaging lens assembly module, and the first tapered surface 341 and the second tapered surface 342 are intersected to form a tip-end minimal opening 343. In detail, the structure of the tip-end minimal opening structure 340 and the light blocking sheet 312a are cooperated to each other, the light absorbing layer 330 for disposing the aperture stop can be disposed on a suitable position to promote the steady state of the function of the aperture stop, and a shape of the first tapered surface 341 and a shape of the second tapered surface 342 are cooperated to a shape of the light blocking sheet 312a. Therefore, a light trap for absorbing the stray light is formed, and the light absorbing layer 330 can be accumulated in the bottom of the light trap to substantially reduce the possibility of the reflection of the stray light.

Figure 3E:
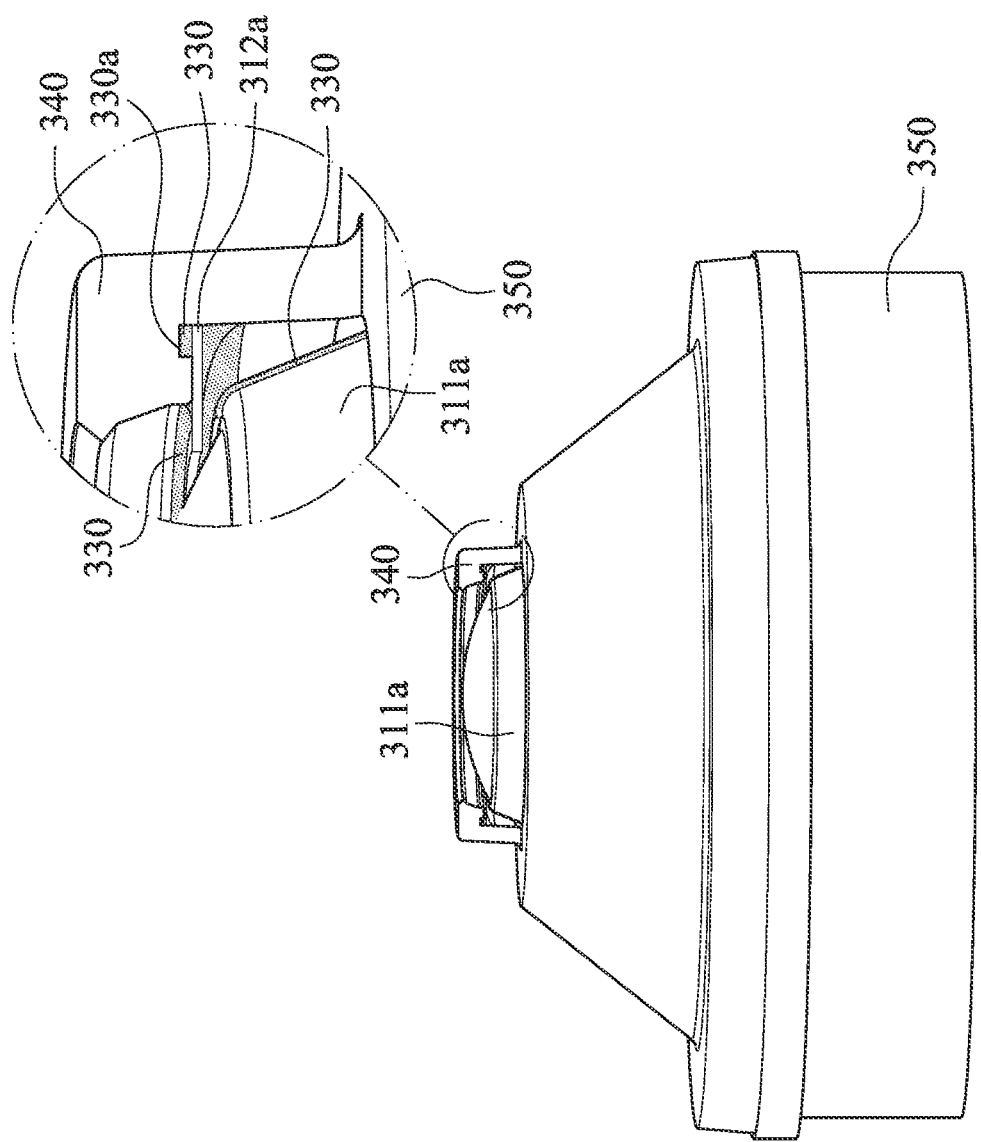
FIG. 3E is a cross-sectional view of the tip-end minimal opening structure of the imaging lens assembly module according to the 3rd embodiment in FIG. 3A.
Figure 3F:
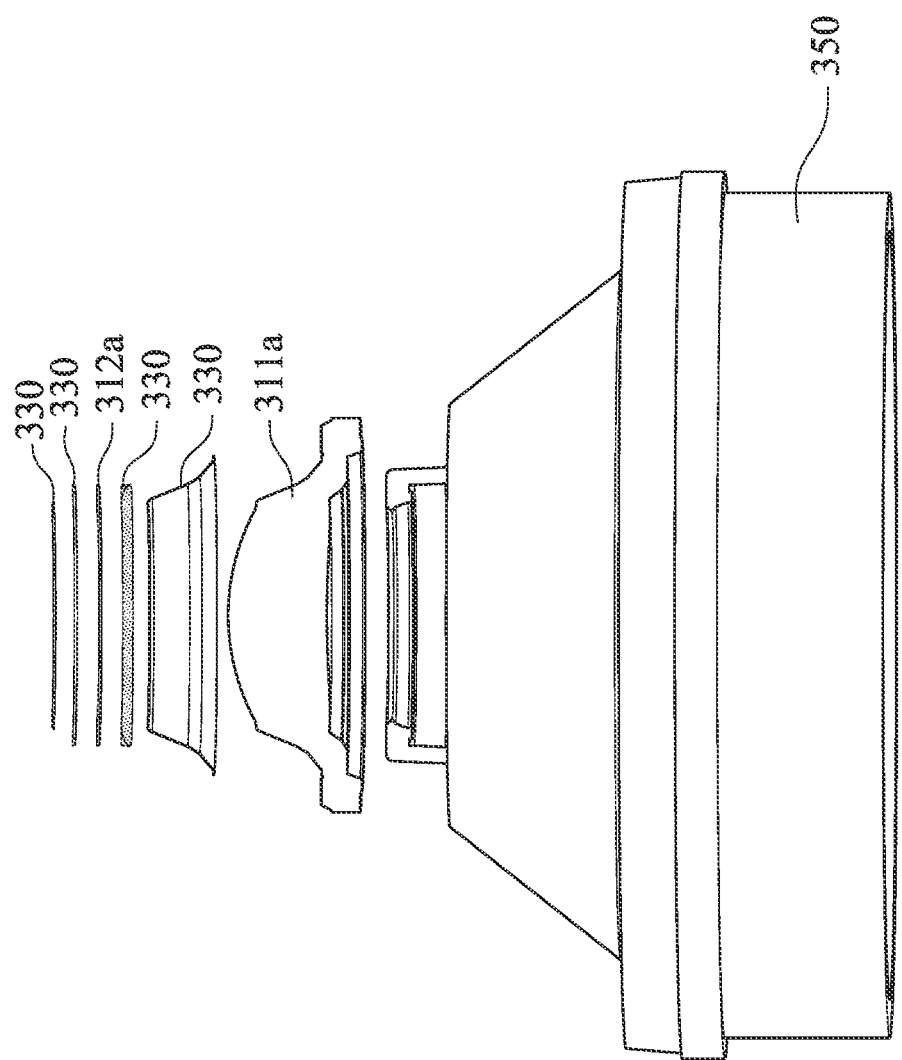
FIG. 3F is another partial exploded view of the imaging lens assembly module according to the 3rd embodiment in FIG. 3A.

FIG. 3E is a cross-sectional view of the tip-end minimal opening structure 340 of the imaging lens assembly module according to the 3rd embodiment in FIG. 3A. FIG. 3F is another partial exploded view of the imaging lens assembly module according to the 3rd embodiment in FIG. 3A. In FIGS. 3E and 3F, the light blocking element assembling surface 320 is disposed on an object side of the light blocking sheet 312a, the light blocking element assembling surface 320 faces toward the image side of the imaging lens assembly module. The light blocking element assembling surface 320 is circular annular, and for the light blocking sheet 312a mounted thereon.

The light absorbing layer 330 can be further disposed on the object-side surface 3121 of the light blocking sheet 312a. Furthermore, the initial condition of the light absorbing layer 330 is a liquid, so that the light absorbing layer 330 has extensibility. Therefore, the light absorbing layer 330 extends and permeates to the object-side surface 3121 of the light blocking sheet 312a, and the light absorbing layer 330 can be accumulated in the bottom of the second tapered surface 342 to be a bottom of the light trap. Moreover, a concave-curved ring is formed after an appearance of the light absorbing layer 330 solidifying, and the light absorbing layer is opaque. Therefore, the reflection condition of the stray light is substantially reduced, and the efficiency of absorbing the non-imaging light is increased.

The light absorbing layer 330 can be closer to the through hole 3124 of the light blocking sheet 312a than the light blocking element assembling surface 320 to the through hole 3124 of the light blocking sheet 312a, or the light absorbing layer 330 can be farther from the through hole 3124 of the light blocking sheet 312a than the light blocking element assembling surface 320 from the through hole 3124 of the light blocking sheet 312a. When the light absorbing layer 330 is closer to the through hole 3124 of the light blocking sheet 312a than the light blocking element assembling surface 320 to the through hole 3124 of the light blocking sheet 312a, the efficiency for fixing the aperture stop via the light absorbing layer 330 can be increased. When the light absorbing layer 330 is farther from the through hole 3124 of the light blocking sheet 312a than the light blocking element assembling surface 320 from the through hole 3124 of the light blocking sheet 312a, the imaging lens assembly module is observed from the direction parallel to the optical axis X to the image side of the imaging lens assembly module, the light absorbing layer 330 disposed on the object-side surface 3121 of the light blocking sheet 312a is shielded via the tip-end minimal opening structure 340. Furthermore, it is favorable for being a glue-storage groove 330a, and the glue-storage groove 330a is for the light absorbing layer 330 with a flow state accumulated as uneven thickness via a shielding condition. The tip-end minimal opening structure 340 can be adjusted the surface characteristic thereof owing to be made of a plastic material, and the light absorbing layer 330 with the flow state is with capillary effect. Cooperating with a shielding configuration of the tip-end minimal opening structure 340, the light absorbing layer 330 with the flow state is accumulated as uneven thickness. The disposition of the glue-storage groove 330a is to accumulate a portion of the light absorbing layer 330, most of the light absorbing layer 330 can be stored in the glue-storage groove 330a, and the excessive light absorbing layer 330 can be avoided so as to a better adhesion between the light blocking sheet 312a and the light blocking element assembling surface 320. An accumulation of the light absorbing layer 330 is not occupied on the entire light blocking element assembling surface 320, and a condition of the light blocking sheet 312a exclusively drifted on the light blocking element assembling surface 320 can be reduced.

In FIGS. 3C and 3F, the light absorbing layer 330 disposed on the object-side surface 3121 of the light blocking sheet 312a surrounds the through hole 3124 of the light blocking sheet 312a, and the light absorbing layer 330 is formed of the concave-curved ring, and the concave-curved ring is recessed to the light blocking element assembling surface 320. Therefore, it is favorable for increasing the efficiency for fixing the aperture stop via the light absorbing layer 330.

In FIG. 3D, there is without additional one or more optical lens elements on an object side of the first optical lens element 311a, and the outer peripheral portion 3112 of the first optical lens element 311a can further include an object-side receiving surface 3112a. The object-side receiving surface 3112a faces toward the object side of the first optical lens element 311a to be circular annular, and the object-side receiving surface 3112a is for being assembled with the lens barrel 350 of the imaging lens assembly module. The lens barrel 350 can further include a vertical receiving surface 351, and the vertical receiving surface 351 is contacted with the object-side receiving surface 3112a. In detail, the object-side surface 3112a of the first optical lens element 311a does not need to be connected to the through hole 3124 of the light blocking sheet 312a. Therefore, it is favorable for dispersing the assembling stress of the entire optical element set, and the excessive stress is avoided to apply on the aperture stop to reduce the possibility of deterioration of the quality of the aperture stop.

The object-side receiving surface 3112a does not overlap with the light blocking element assembling surface 320 in a direction parallel to the optical axis X. Therefore, the range of applied force is staggered to avoid the light blocking sheet 312a being affected via the optical element set during the assembling process. The light blocking sheet 312a does not overlap with the lens barrel 350 in the direction parallel to the optical axis X and toward the image side of the imaging lens assembly module. Therefore, it is favorable for reducing the complexity of the assembling process of the aperture stop, and the efficiency of manufacture can be promoted. Furthermore, the assembling direction of the aperture stop is consistent with the assembling direction of the optical element set to avoid increasing the cost of machinery, which is for turning the lens barrel 350 during the assembling process.

In FIGS. 3A and 3D, according to the 3rd embodiment, every definition of ever parameter is the same as the 1st embodiment, and will not be described again herein. Please refer to the Table 3.

TABLE 3

| 3rd embodiment | | | |
|---|---|---|---|
| ψd (mm) | 1.48 | ψd/ψsa | 1.02 |
| ψsa (mm) | 1.45 | (ψsd − ψsa)/2 (mm) | 0.20 |
| ψsd (mm) | 1.85 | (ψsd − ψsa)/ψsa | 0.28 |

4th Embodiment

Figure 4A:
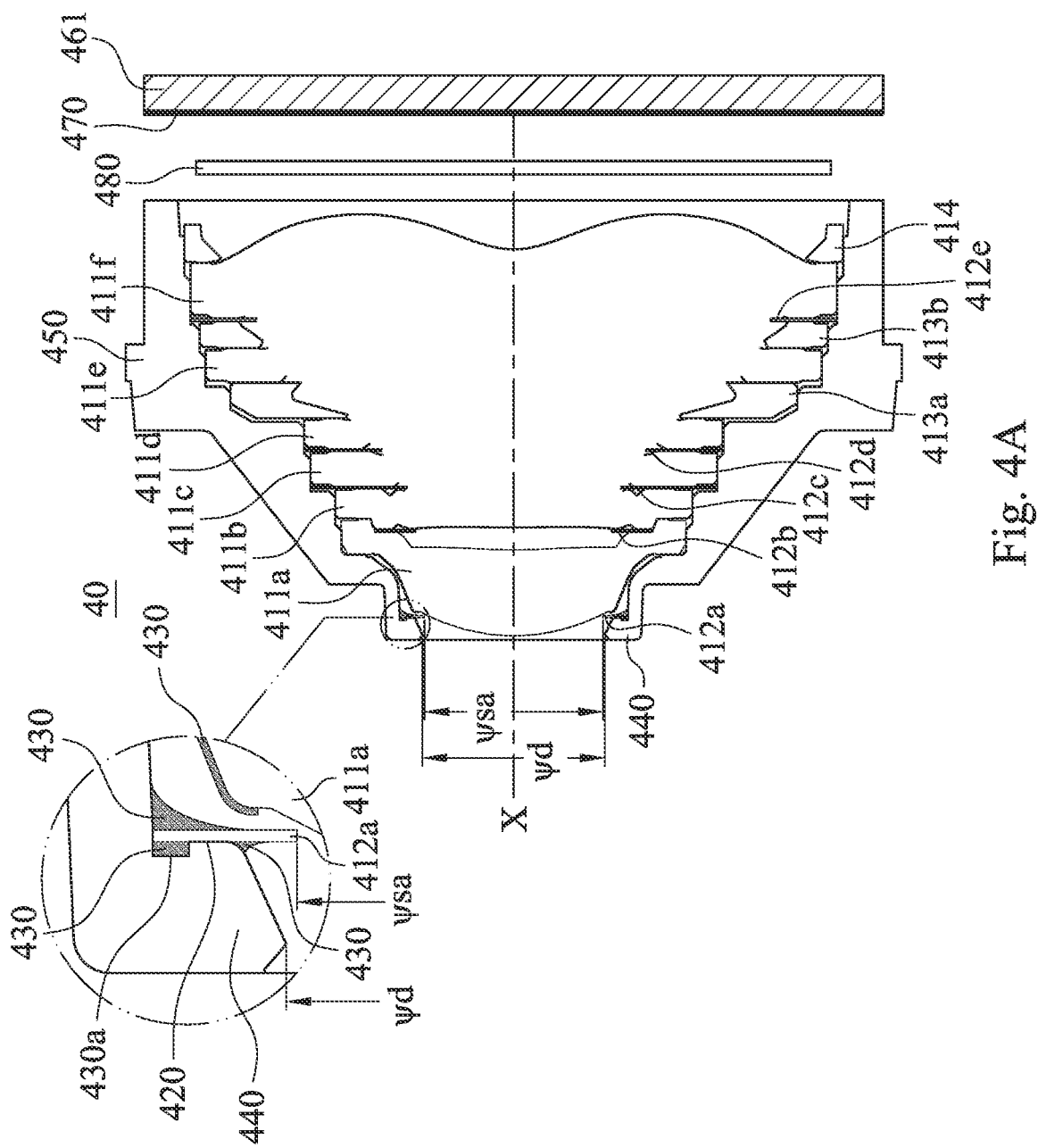
FIG. 4A is a schematic view of a camera module according to the 4th embodiment of the present disclosure.
Figure 4B:
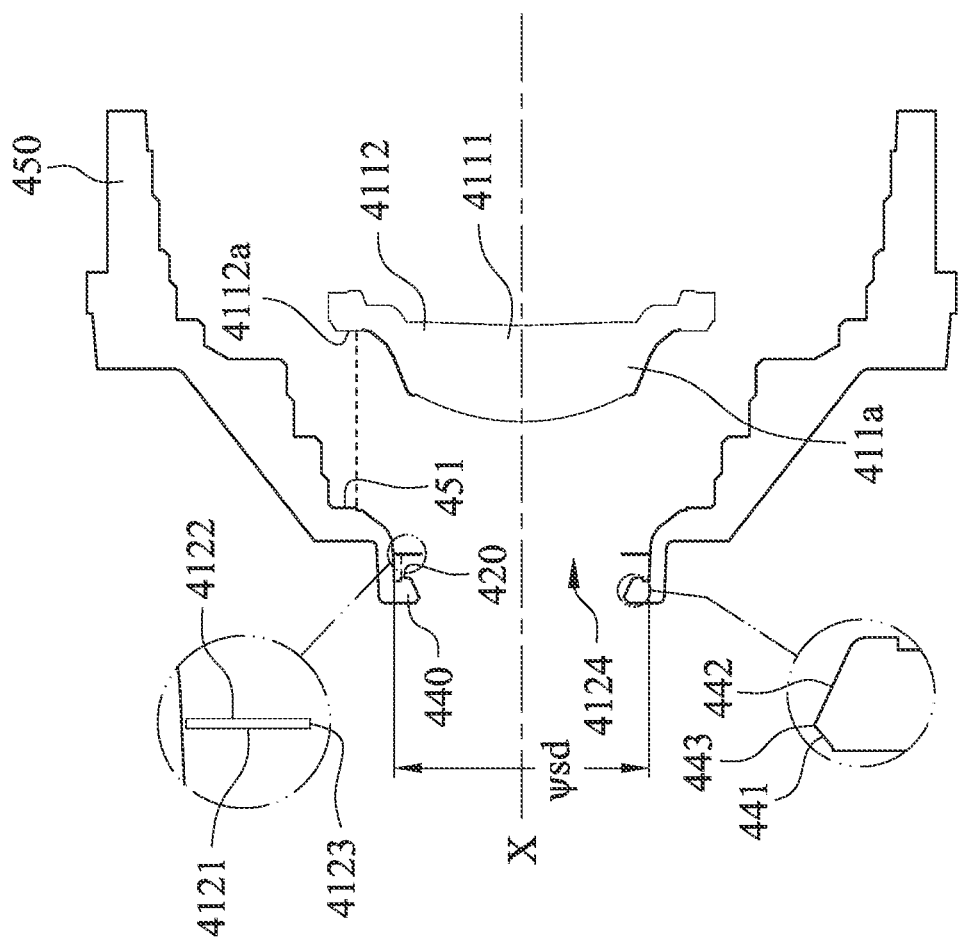
FIG. 4B is a schematic view of a partial optical element set, a lens barrel and a tip-end minimal opening structure of an imaging lens assembly module according to the 4th embodiment in FIG. 4A.

FIG. 4A is a schematic view of a camera module 40 according to the 4th embodiment of the present disclosure. FIG. 4B is a schematic view of a partial optical element set, a lens barrel 450 and a tip-end minimal opening structure 440 of an imaging lens assembly module according to the 4th embodiment in FIG. 4A. In FIGS. 4A and 4B, the camera module 40 includes the imaging lens assembly module (its reference numeral is omitted) and an image sensor module (its reference numeral is omitted). The imaging lens assembly module has an optical axis X, and includes the optical element set (its reference numeral is omitted), a light blocking element assembling surface 420, a light absorbing layer 430, the tip-end minimal opening structure 440, the lens barrel 450, an imaging surface 470 and a filter element 480. The optical element set is disposed in the lens barrel 450. The tip-end minimal opening structure 440 is located on an object side of the imaging lens assembly module. The lens barrel 450 is disposed on an image side of the tip-end minimal opening structure 440. The imaging surface 470 is located on an image side of the lens barrel 450. The image sensor module includes an image sensor 461, and the image sensor 461 is disposed on the imaging surface 470.

The optical element set includes at least one optical lens element and at least one light blocking sheet, and the optical element set can further include a plurality of spacers and a retainer 414. In detail, according to the 4th embodiment, the optical element set, in order from an object side to an image side, includes a light blocking sheet 412a, a first optical lens element 411a, a light blocking sheet 412b, a second optical lens element 411b, a light blocking sheet 412c, a third optical lens element 411c, a light blocking sheet 412d, a fourth optical lens element 411d, a spacer 413a, a fifth optical lens element 411e, a spacer 413b, a light blocking sheet 412e, a sixth optical lens element 411f and the retainer 414. Furthermore, structures, surface shapes and so on of the second optical lens element 411b, the third optical lens element 411c, the fourth optical lens element 411d, the fifth optical lens element 411e and the sixth optical lens element 411f can be disposed according to different imaging demand, and the structures, the surface shapes and so on are not important to the present disclosure, and will not disclose details thereof herein.

In FIG. 4B, the first optical lens element 411a, in order from the optical axis X to a peripheral region of the first optical lens element 411a, includes an optical effective portion 4111 and an outer peripheral portion 4112, wherein the outer peripheral portion 4112 surrounds the optical effective portion 4111. The light blocking sheet 412a is disposed on one side of an object side and an image side of the outer peripheral portion 4112 of the first optical lens element 411a which is without additional one or more optical lens elements disposed thereon, and spaced apart from the outer peripheral portion 4112 of the first optical lens element 411a, that is, the light blocking sheet 412a is not contacted with the outer peripheral portion 4112 of the first optical lens element 411a. The light blocking sheet 412a includes an object-side surface 4121, an image-side surface 4122 and an inner opening surface 4123, wherein the inner opening surface 4123 surrounds a through hole 4124 of the light blocking sheet 412a, and the inner opening surface 4123 is connected to the object-side surface 4121 and the image-side surface 4122. According to the 4th embodiment, it should be mentioned that each light blocking sheet (including the light blocking sheets 412b, 412c, 412d, 412e) of the optical element set includes the object-side surface, the image-side surface and the inner opening surface, and the disposition thereof is the same as the light blocking sheet 412a. Also, each optical lens element (including the second optical lens element 411b, the third optical lens element 411c, the fourth optical lens element 411d, the fifth optical lens element 411e, the sixth optical lens element 411f) includes the optical effective portion and the outer peripheral portion, and the disposition thereof is the same as the first optical lens element 411a. Hence, only the light blocking sheet 412a and the first optical lens element 411a are described herein.

In FIG. 4A, the light absorbing layer 430 is disposed on one side of the object side and the image side of the light blocking sheet 412a which has the first optical lens element 411a and for fixing the light blocking sheet 412a on the light blocking element assembling surface 420. In detail, the light absorbing layer 430 is for absorbing the stray light in the imaging lens assembly module, and the light absorbing layer 430 can be for fixing the light blocking sheet 412a on the light blocking element assembling surface 420, so that the precisely manufactured light blocking sheet 412a does not be compressed and destroyed via the first optical lens element 411a. Therefore, it is favorable for decreasing the misgiving which the light blocking sheet 412a is destroyed during the assembling process to ensure the better light blocking performance. Hence, the light absorbing layer 430 can further be an aperture stop of the imaging lens assembly module to promote the optical quality of the aperture stop.

The tip-end minimal opening structure 440 is circular symmetrical about the optical axis X as a center, and the tip-end minimal opening structure 440 is disposed on an object side of the light blocking element assembling surface 420, and disposed on one side of the object side and the image side of the first optical lens element 411a which is without additional one or more optical lens elements disposed thereon, wherein the tip-end minimal opening structure 440 includes a first tapered surface 441 and a second tapered surface 442, the first tapered surface 441 is tapered from an object side of the imaging lens assembly module to the image side of the imaging lens assembly module, the second tapered surface 442 is tapered from the image side of the imaging lens assembly module to the object side of the imaging lens assembly module, and the first tapered surface 441 and the second tapered surface 442 are intersected to form a tip-end minimal opening 443. In detail, the structure of the tip-end minimal opening structure 440 and the light blocking sheet 412a are cooperated to each other, the light absorbing layer 430 for disposing the aperture stop can be disposed on a suitable position to promote the steady state of the function of the aperture stop, and a shape of the first tapered surface 441 and a shape of the second tapered surface 442 are cooperated to a shape of the light blocking sheet 412a. Therefore, a light trap for absorbing the stray light is formed, and the light absorbing layer 430 can be accumulated in the bottom of the light trap to substantially reduce the possibility of the reflection of the stray light.

In FIG. 4A, the light blocking element assembling surface 420 is disposed on one side of the object side and the image side of the light blocking sheet 412a which is without additional one or more optical lens elements disposed thereon, and the light blocking element assembling surface 420 faces toward the first optical lens element 411a and is circular annular for the light blocking sheet 412a mounted thereon.

The light absorbing layer 430 is disposed on the object-side surface 4121 of the light blocking sheet 412a surrounds the through hole 4124 of the light blocking sheet 412a, and the light absorbing layer 430 is formed of a concave-curved ring. Furthermore, the light absorbing layer 430 can be further disposed on the object-side surface 4121 of the light blocking sheet 412a. Therefore, it is favorable for increasing the efficiency of absorbing the non-imaging light. Moreover, the concave-curved ring is recessed to an outer diameter surface of the light blocking sheet 412a. Therefore, it is favorable for increasing the stability and the steady state of the light blocking sheet 412a, which are not affected by the external surroundings.

In detail, the initial condition of the light absorbing layer 430 is a liquid, so the light absorbing layer 430 has extensibility. Therefore, the light absorbing layer 430 extends and permeates to the object-side surface 4121 of the light blocking sheet 412a, and the light absorbing layer 430 can be accumulated in the bottom of the second tapered surface 442 to be a bottom of the light trap. The light absorbing layer 430 can be made of a quick-drying ink based on a plastic material including a black epoxy resin, an oil-based coating including a resin, an epoxy resin or an acrylic or a coating of a photocurable colloid mixed with an ink. Moreover, the concave-curved ring is formed after an appearance of the light absorbing layer 430 solidifying, and the light absorbing layer 430 is opaque. Therefore, the reflection condition of the stray light can be substantially reduced, and the efficiency of absorbing the non-imaging light is increased.

The light absorbing layer 430 can be closer to the through hole 4124 of the light blocking sheet 412a than the light blocking element assembling surface 420 to the through hole 4124 of the light blocking sheet 412a, or the light absorbing layer 430 can be farther from the through hole 4124 of the light blocking sheet 412a than the light blocking element assembling surface 420 from the through hole 4124 of the light blocking sheet 412a. When the light absorbing layer 430 is closer to the through hole 4124 of the light blocking sheet 412a than the light blocking element assembling surface 420 to the through hole 4124 of the light blocking sheet 412a, the efficiency for fixing the aperture stop via the light absorbing layer 430 can be increased. When the light absorbing layer 430 is farther from the through hole 4124 of the light blocking sheet 412a than the light blocking element assembling surface 420 from the through hole 4124 of the light blocking sheet 412a, the imaging lens assembly module is observed from the direction parallel to the optical axis X to the image side of the imaging lens assembly module, the light absorbing layer 430 disposed on the object-side surface 4121 of the light blocking sheet 412a is shielded via the tip-end minimal opening structure 440. Furthermore, it is favorable for being a glue-storage groove 430a, and the glue-storage groove 430a is for the light absorbing layer 430 with a flow state accumulated as uneven thickness via a shielding condition. The tip-end minimal opening structure 440 can be adjusted the surface characteristic thereof owing to be made of a plastic material, and the light absorbing layer 430 with the flow state is with capillary effect. Cooperating with a shielding configuration of the tip-end minimal opening structure 440, the light absorbing layer 430 with the flow state is accumulated as uneven thickness. The disposition of the glue-storage groove 430a is to accumulate a portion of the light absorbing layer 430, most of the light absorbing layer 430 can be stored in the glue-storage groove 430a, and the excessive light absorbing layer 430 can be avoided so as to a better adhesion between the light blocking sheet 412a and the light blocking element assembling surface 420. An accumulation of the light absorbing layer 430 is not occupied on the entire light blocking element assembling surface 420, and a condition of the light blocking sheet 412a exclusively drifted on the light blocking element assembling surface 420 can be reduced.

In FIG. 4B, one side of the object side and the image side of the first optical lens element 411a is without additional one or more optical lens elements disposed thereon, and the outer peripheral portion 4112 of the first optical lens element 411a can further include an object-side receiving surface 4112a. The object-side receiving surface 4112a faces toward the object side of the first optical lens element 411a to be circular annular, and the object-side receiving surface 4112a is for being assembled with the lens barrel 450 of the imaging lens assembly module. The lens barrel 450 can further include a vertical receiving surface 451, and the vertical receiving surface 451 is contacted with the object-side receiving surface 4112a. In detail, the object-side surface 4112a of the first optical lens element 411a does not need to be connected to the through hole 4124 of the light blocking sheet 412a. Therefore, it is favorable for dispersing the assembling stress of the entire optical element set.

The object-side receiving surface 4112a does not overlap with the light blocking element assembling surface 420 in a direction parallel to the optical axis X. Therefore, the range of applied force is staggered to avoid the light blocking sheet 412a being affected via the optical element set during the assembling process. The light blocking sheet 412a does not overlap with the lens barrel 450 in the direction parallel to the optical axis X and toward the image side of the imaging lens assembly module. Therefore, it is favorable for reducing the complexity of the assembling process of the aperture stop, and the efficiency of manufacture can be promoted. Furthermore, the assembling direction of the aperture stop is consistent with the assembling direction of the optical element set to avoid increasing the cost of machinery, which is for turning the lens barrel 450 during the assembling process.

In FIGS. 4A and 4B, according to the 4th embodiment, every definition of ever parameter is the same as the 1st embodiment, and will not be described again herein. Please refer to the Table 4.

TABLE 4

| 4th embodiment | | | |
|---|---|---|---|
| $\psi d$ (mm) | 1.48 | $\psi d/\psi sa$ | 1.02 |
| $\psi sa$ (mm) | 1.45 | $(\psi sd - \psi sa)/2$ (mm) | 0.20 |
| $\psi sd$ (mm) | 1.85 | $(\psi sd - \psi sa)/\psi sa$ | 0.28 |

5th Embodiment

Figure 5A:
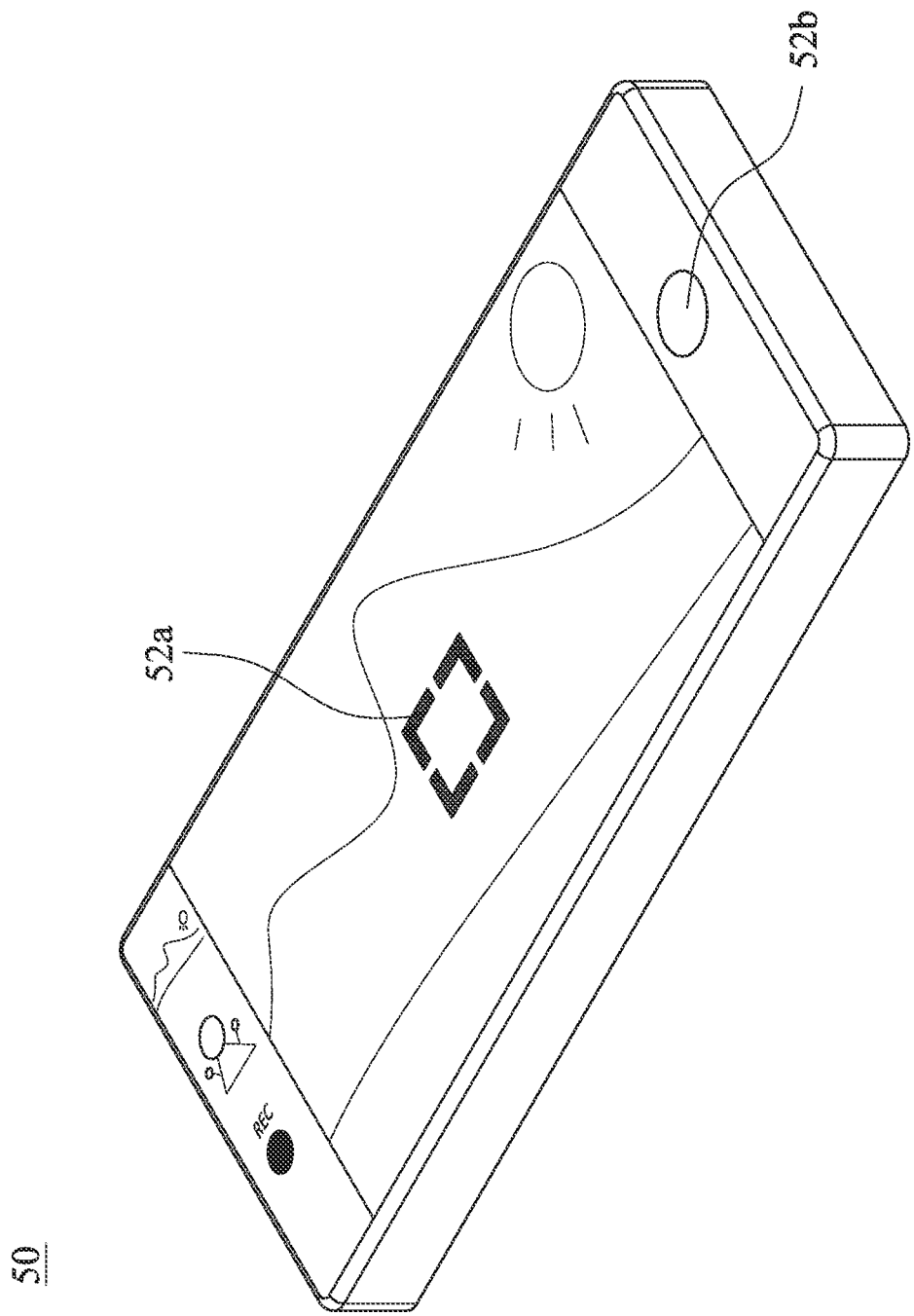
FIG. 5A is a schematic view of an electronic device according to the 5th embodiment of the present disclosure.
Figure 5B:
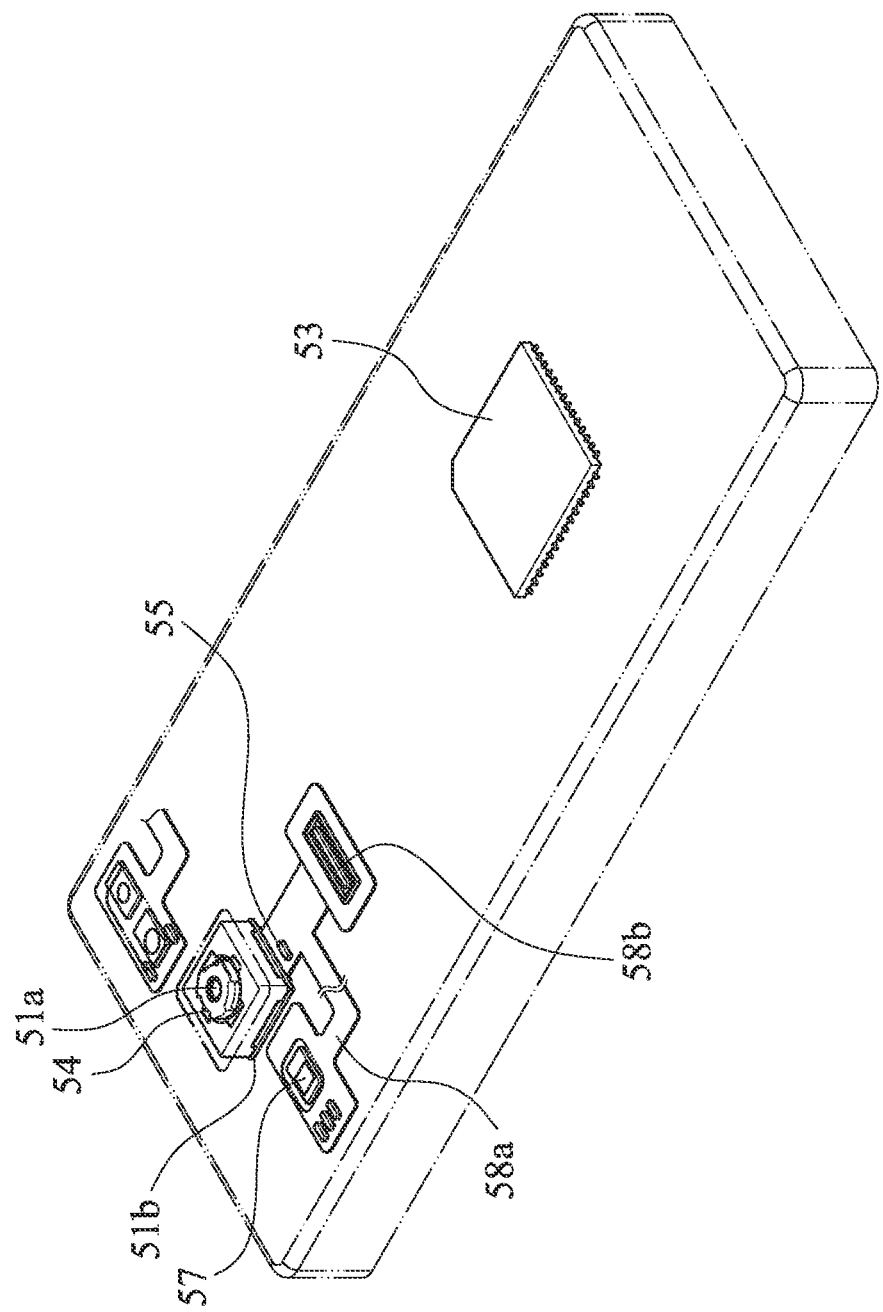
FIG. 5B is another schematic view of the electronic device according to the 5th embodiment of the present disclosure.

FIG. 5A is a schematic view of an electronic device 50 according to the 5th embodiment of the present disclosure. FIG. 5B is another schematic view of the electronic device 50 according to the 5th embodiment of the present disclosure. In FIGS. 5A and 5B, the electronic device 50 of the 5th embodiment is a smart phone, wherein the electronic device 50 includes the camera module 51 according to the present disclosure, wherein the camera module 51 can be one of the camera modules according to the aforementioned 1st embodiment to the 4th embodiment, and the camera module 51 includes an imaging lens assembly module 51a and an image sensor module 51b, but is not limited thereto. Therefore, it is favorable for satisfying a mass production and an appearance demand of the imaging lens assembly module disposed on the camera module with the electronic device market nowadays.

Furthermore, the user activates the capturing mode via a user interface 52 of the electronic device 50, wherein the user interface 52 of the 5th embodiment can be a touch screen 52a, a button 52b and etc. At this moment, the imaging light is converged on the image sensor module 51b via the imaging lens assembly module 51a, and the electronic signal associated with image is output to an image signal processor (ISP) 53.

Figure 5C:
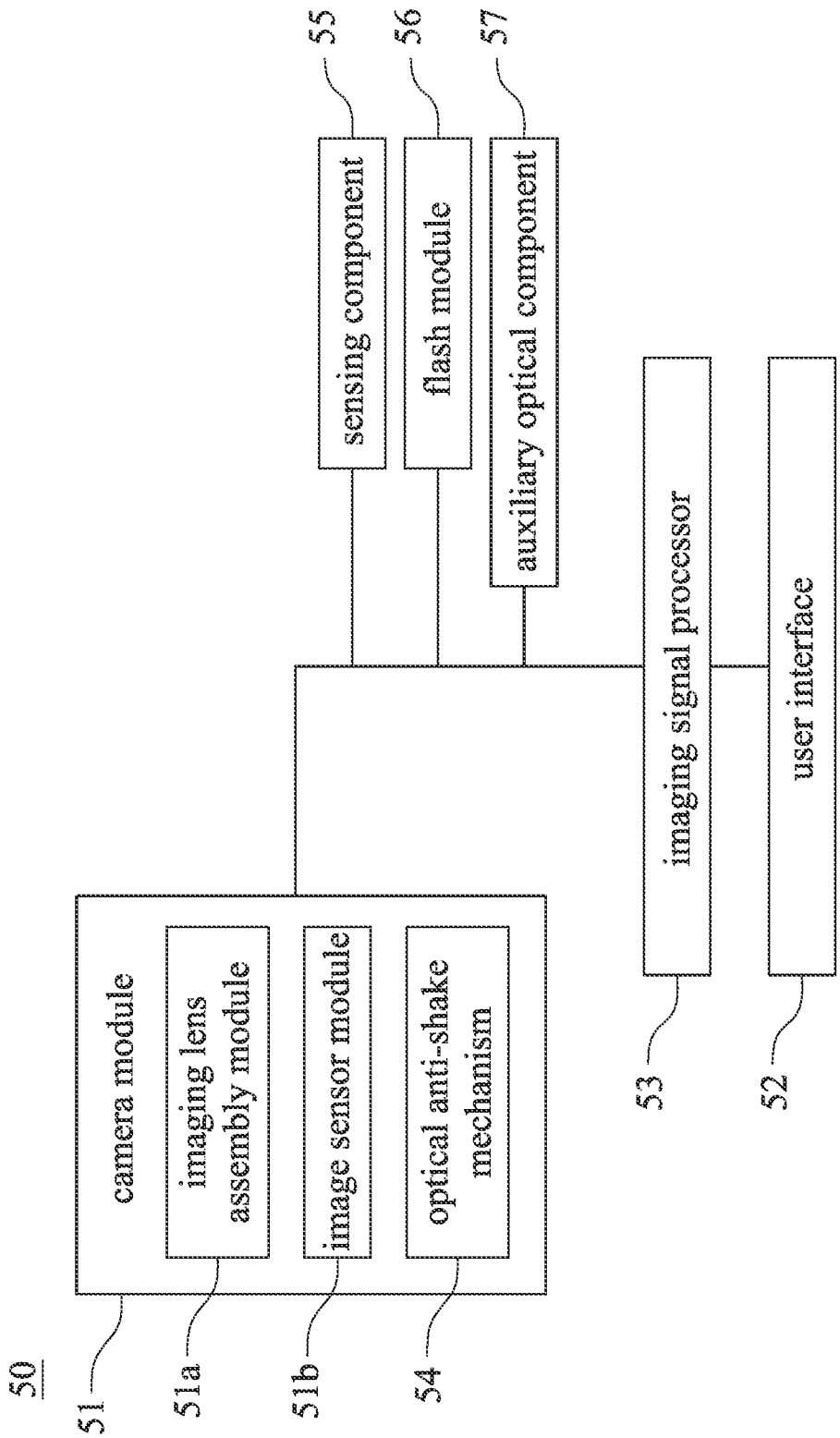
FIG. 5C is a block diagram of the electronic device of the 5th embodiment.

FIG. 5C is a block diagram of the electronic device 50 of the 5th embodiment, and in particular, the block diagram is related to the camera of the electronic device 50. In FIGS. 5A to 5C, the electronic device 50 can further include an optical anti-shake mechanism 54 based on the camera specification of the electronic device 50. Moreover, the electronic device 50 can further include at least one auxiliary optical component 57 and at least one sensing component 55. The auxiliary optical component 57 can be a flash module 56 for compensating for the color temperature, an infrared distance measurement component, a laser focus module and etc. The sensing component 55 can have functions for sensing physical momentum and kinetic energy, and thereby can be an accelerator, a gyroscope, and a Hall effect element, to sense shaking or jitters applied by hands of the user or external environments. Accordingly, the functions of an autofocus assembly and the optical anti-shake mechanism 54 of the imaging lens assembly module 51a can be aided and enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 52a and manually operate the view finding range on the touch screen 52a to achieve the auto focus function of what you see is what you get.

Furthermore, in FIG. 5B, the imaging lens assembly module 51a, the image sensor module 51b, the optical anti-shake mechanism 54, the sensing component 55 and the auxiliary optical component 57 can be disposed on a flexible printed circuit board (FPC) 58a and electrically connected with the associated components, such as the imaging signal processor 53, via a connector 58b to perform a capturing process. Since the current electronic devices, such as smart phones, have a tendency of being compact, the way of firstly disposing the imaging lens assembly module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly module can also be controlled more flexibly via the touch screen of the electronic device. According to the 5th embodiment, the electronic device 50 includes a plurality of sensing components 55 and a plurality of auxiliary optical components 57. The sensing components 55 and the auxiliary optical components 57 are disposed on the flexible printed circuit board 58a and at least one other flexible printed circuit board (its reference numeral is omitted) and electrically connected with the associated components, such as the image signal processor 53, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 50 can further include but not be limited to a display, a control unit, a storage unit, a random access memory (RAM), a read-only memory (ROM), or a combination thereof.

6th Embodiment

FIG. 6 is an electronic device 60 according to the 6th embodiment of the present disclosure. The electronic device 60 of the 6th embodiment is a tablet personal computer. The electronic device 60 includes a camera module 61 according to the present disclosure, and the camera module 61 includes an imaging lens assembly module (not shown) and an image sensor module (not shown). The imaging lens assembly module is disposed on the image sensor module, and the image sensor module includes an image sensor (not shown).

7th Embodiment

Figure 7:
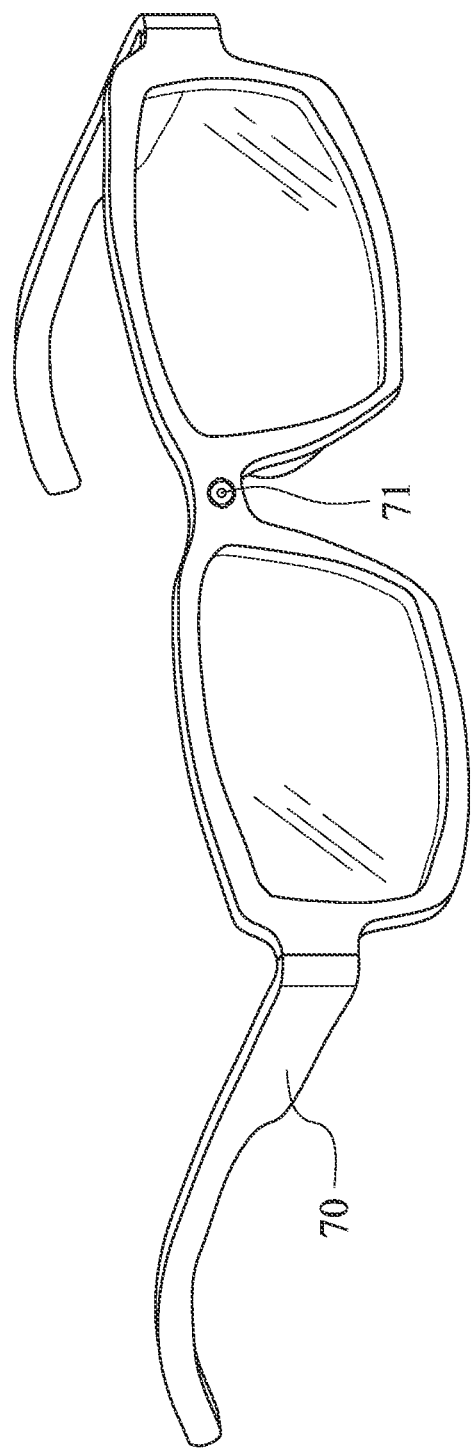
FIG. 7 is a schematic view of an electronic device according to the 7th embodiment of the present disclosure.

FIG. 7 is an electronic device 70 according to the 7th embodiment of the present disclosure. The electronic device 70 of the 7th embodiment is a wearable device. The electronic device 70 includes a camera module 71 according to the present disclosure, and the camera module 71 includes an imaging lens assembly module (not shown) and an image sensor module (not shown). The imaging lens assembly module is disposed on the image sensor module, and the image sensor module includes an image sensor (not shown).

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, which has an optical axis, comprising:
　an optical element set, comprising:
　　at least one optical lens element, which is a plastic lens element, and an object side of the at least one optical lens element without additional one or more optical lens elements disposed thereon, the at least one optical lens element, in order from the optical axis to a peripheral region thereof, comprising:
　　　an optical effective portion; and
　　　an outer peripheral portion surrounding the optical effective portion; and
　　at least one light blocking sheet disposed on an object side of the outer peripheral portion of the at least one optical lens element, and spaced apart from the outer peripheral portion of the at least one optical lens element, the at least one light blocking sheet comprising:
　　　an object-side surface;
　　　an image-side surface; and
　　　an inner opening surface surrounding a through hole of the at least one light blocking sheet, and the inner opening surface connected to the object-side surface and the image-side surface;
　a light blocking element assembling surface disposed on an object side of the at least one light blocking sheet, and the light blocking element assembling surface facing toward an image side of the imaging lens assembly module and being surrounding the through hole of the at least one light blocking sheet and for the at least one light blocking sheet mounted thereon; and a light absorbing layer disposed on the image-side surface of the at least one light blocking sheet and for fixing the at least one light blocking sheet on the light blocking element assembling surface;

wherein a void is maintained between the at least one light blocking sheet and the outer peripheral portion of the at least one optical lens element;

wherein a diameter of the through hole of the at least one light blocking sheet is ψsa, an outer diameter of the at least one light blocking sheet is ψsd, and the following condition is satisfied:

$$0.1 < (\psi sd - \psi sa)/\psi sa < 0.4.$$

2. The imaging lens assembly module of claim 1, further comprising:

a tip-end minimal opening structure disposed on an object side of the light blocking element assembling surface, wherein the tip-end minimal opening structure comprises a first tapered surface and a second tapered surface, and the first tapered surface and the second tapered surface are intersected to form a tip-end minimal opening;

wherein a diameter of the tip-end minimal opening is ψd, the diameter of the through hole of the at least one light blocking sheet is ψsa, and the following condition is satisfied:

$$0.85 < \psi d/\psi sa < 1.15.$$

3. The imaging lens assembly module of claim 1, wherein the light absorbing layer is further disposed on the object-side surface of the at least one light blocking sheet.

4. The imaging lens assembly module of claim 3, wherein the light absorbing layer is closer to the through hole of the at least one light blocking sheet than the light blocking element assembling surface to the through hole of the at least one light blocking sheet.

5. The imaging lens assembly module of claim 3, wherein the light absorbing layer is farther from the through hole of the at least one light blocking sheet than the light blocking element assembling surface from the through hole of the at least one light blocking sheet.

6. The imaging lens assembly module of claim 1, wherein the outer peripheral portion of the at least one optical lens element further comprises an object-side receiving surface facing toward the object side of the at least one optical lens element to be circular annular, the object-side receiving surface is for being assembled with a lens barrel of the imaging lens assembly module, and the lens barrel comprises a vertical receiving surface contacted with the object-side receiving surface.

7. The imaging lens assembly module of claim 6, wherein the object-side receiving surface does not overlap with the light blocking element assembling surface in a direction parallel to the optical axis.

8. The imaging lens assembly module of claim 6, wherein the at least one light blocking sheet does not overlap with the lens barrel in a direction parallel to the optical axis and toward the image side of the imaging lens assembly module.

9. The imaging lens assembly module of claim 1, wherein the diameter of the through hole of the at least one light blocking sheet is ψsa, the outer diameter of the at least one light blocking sheet is ψsd, and the following condition is satisfied:

$$0.08 \text{ mm} < (\psi sd - \psi sa)/2 < 0.5 \text{ mm}.$$

10. A camera module, comprising:
the imaging lens assembly module of claim 1; and
an image sensor module, wherein the imaging lens assembly module is disposed on the image sensor module, and the image sensor module comprises an image sensor.

11. An electronic device, comprising:
the camera module of claim 10.

* * * * *